US011976445B2

(12) United States Patent
Colman et al.

(10) Patent No.: US 11,976,445 B2
(45) Date of Patent: May 7, 2024

(54) ATMOSPHERIC WATER GENERATION METHOD AND DEVICE

(71) Applicant: BEAIR WATER AND AIR TECHNOLOGIES LTD., Jerusalem (IL)

(72) Inventors: Joshua Lewis Colman, Jerusalem (IL); Gershon Levitsky, Jerusalem (IL)

(73) Assignee: BEAIR WATER AND AIR TECHNOLOGIES LTD., Jerusalem (IL)

( * ) Notice: Subject to any disclaimer, the term of this patent is extended or adjusted under 35 U.S.C. 154(b) by 685 days.

(21) Appl. No.: 17/057,984

(22) PCT Filed: May 28, 2019

(86) PCT No.: PCT/IL2019/050610
§ 371 (c)(1),
(2) Date: Nov. 23, 2020

(87) PCT Pub. No.: WO2019/229749
PCT Pub. Date: Dec. 5, 2019

(65) Prior Publication Data
US 2021/0198872 A1    Jul. 1, 2021

Related U.S. Application Data

(60) Provisional application No. 62/677,116, filed on May 28, 2018.

(51) Int. Cl.
*F25D 21/14*    (2006.01)
*B01D 5/00*    (2006.01)
(Continued)

(52) U.S. Cl.
CPC ............... *E03B 3/28* (2013.01); *B01D 5/006* (2013.01); *B01D 5/0048* (2013.01);
(Continued)

(58) Field of Classification Search
CPC ......... E03B 3/28; B01D 5/006; B01D 5/0048; B01D 5/0017; B01D 3/268; B01D 2257/80; B01D 2313/243
(Continued)

(56) References Cited

U.S. PATENT DOCUMENTS

| 4,909,810 A | 3/1990 | Nakao et al. |
| 5,681,433 A | 10/1997 | Friesen et al. |

(Continued)

FOREIGN PATENT DOCUMENTS

| CN | 102505732 A | 6/2012 |
| NL | 2014202 A | 9/2016 |

OTHER PUBLICATIONS

Bagheri, Farshid (2018) Performance investigation of atmospheric water harvesting systems, Water Resources and Industry, 20:23-28.
(Continued)

*Primary Examiner* — Davis D Hwu
(74) *Attorney, Agent, or Firm* — The Roy Gross Law Firm, LLC; Roy Gross

(57) ABSTRACT

Provided herein are systems, devices and methods for generating water from atmospheric air, making use of a molecular selective processing unit and a vapor exchange unit to efficiently generate pure water from water vapors, selectively separated from air.

17 Claims, 13 Drawing Sheets

(51) Int. Cl.
*E03B 3/28* (2006.01)
*B01D 53/26* (2006.01)

(52) U.S. Cl.
CPC .......... *B01D 5/0051* (2013.01); *B01D 53/268* (2013.01); *B01D 2257/80* (2013.01); *B01D 2313/243* (2013.01)

(58) Field of Classification Search
USPC .......................................................... 62/291
See application file for complete search history.

(56) References Cited

U.S. PATENT DOCUMENTS

| | | | |
|---|---|---|---|
| 5,843,209 A | 12/1998 | Ray et al. | |
| 8,764,888 B2 | 7/2014 | Ophir et al. | |
| 9,067,035 B2 | 6/2015 | Ophir et al. | |
| 9,090,766 B2 | 7/2015 | Rakhman et al. | |
| 9,976,817 B2 | 5/2018 | Kohavi et al. | |
| 2007/0104996 A1* | 5/2007 | Eickhoff | H01M 8/04216 429/444 |
| 2011/0247353 A1 | 10/2011 | Metz | |
| 2012/0117987 A1 | 5/2012 | Claridge et al. | |
| 2012/0183457 A1 | 7/2012 | MacCallum | |
| 2018/0021719 A1 | 1/2018 | Bergmair et al. | |
| 2018/0043297 A1 | 2/2018 | Raizen | |

OTHER PUBLICATIONS

PCT Search Report for International Application No. PCT/IL2019/050610 dated Sep. 12, 2019, 5 pp.
PCT Written Opinion for International Application No. PCT/IL2019/050610 dated Sep. 12, 2019, 7 pp.
PCT Preliminary Report on Patentability for International Application No. PCT/IL2019/050610 dated Dec. 1, 2020, 8 pp.

* cited by examiner

ATMOSPHERIC WATER GENERATION METHOD AND DEVICE

CROSS REFERENCE TO RELATED APPLICATIONS

This application is a National Phase Entry of PCT/IL2019/050610 filed on May 28, 2019, which claims the benefit of priority under 35 U.S.C. § 119(e) of U.S. Provisional Application 62/677,116 filed May 28, 2018. The contents of these applications are incorporated by reference in their entirety.

FIELD OF THE INVENTION

The present invention relates to methods, devices and systems for generating water from air.

BACKGROUND OF THE INVENTION

Atmospheric Water Generators (AWG's) are used to generate clean (potable) water from the humidity naturally found in the ambient air. Though there is at any temperature and relative humidity-level minor concentrations of water vapor and consequently even smaller volumes of liquid water, there are enormous volumes of air in our atmosphere, constantly replenished with water vapor and where more important it does not belong specifically to anyone; it is a gift from G-D for all everywhere on our globe. Such systems are of vast importance in various conditions and locations, such as, but not limited to: Regions where clean water sources are scarce or limited (for example, deserts, regions in Africa, regions in Asia etc.); Undeveloped, inland regions of vast areas, where the development and maintenance of water collection and delivery network infrastructures are not economical let alone feasible; Where for given periods of time and regions, a reliable source of clean water is needed, but it is not economical for that given period to have appropriate water collection and delivery infrastructures built (for example, army camps in remote locations); Emergency response at natural disasters, where the regular water delivery may not be available or trusted.

There are two main methods currently used to generate pure atmospheric, water:
  a) Cooling (and in some cases compression) and Condensation methods, which are presently the most common, where collected ambient air entering the device is cooled to a temperature at least lower than its initial dew point and generally to the dew point temperature that correlates to a level of enclosed water vapor from which it is not further economical to generate water. The water condensed out is then collected for storage, distribution, bottling etc.
  b) Wet Desiccation Method: Air is first passed over a material (such as, brine, zeolites, hydrogels and other materials), that can soak up the humidity in the air, and when quite saturated, the material is placed at low pressure and heated to boil off the absorbed, more concentrated (than in the ambient air) water vapor content at a lower than normal temperature, then condensed out and consequently collected.

Both these methods have their inherent technological advantages and disadvantages: The first group of methods, using condensation, is required to cool large volumes of ambient air flowing through their relatively open system at fast rates. They are more practical and useful where the initial ambient temperature and relative humidity are high. At ambient relative humidity levels below 50%, the dew point required to even initiate condensation is quite low, the final temperature to be reached even lower, depending on what percentage of the available water vapor is to be removed, and hence requiring more energy to condense out the water (which is less to start-off with), in the air.

Notwithstanding this, the process involves a significant latent heat release (~2500 kj/kg) as well as the sensible heat interaction between the air and cooling surface. Hence the condensation process is limited by the rate of heat loss to the ambient air to maintain the temperature below the required dew point temperature. As mentioned above, since anyway, this type technology becomes only relevant for higher temperature & humidity climates, the necessary removal of the latent heat is in general realized by investing more energy. (Farshid Bagher, "Performance investigation of atmospheric water harvesting systems" (2018), Water Resources and Industry, 20 (2018) 23-28).

U.S. Pat. No. 9,976,817, for example, discloses planar element for forming heat exchanger. U.S. Patent Application Publication No. 2018/0021719 is directed to system for membrane assisted humidity harvesting from a feed flow, wind turbine provided therewith and method therefor.

A further drawback with this technology is the fact that it also dictates the need for using a disinfecting means to clean the condensed-out water, since during condensation, bacteria or viruses that are airborne in the incoming air (for vapor stripping) can easily enter during the condensation process. Further, they all require both an efficient particle filter e.g. electrostatic filter at the input to prevent small particles, dust, sand, spores etc. to enter the process directly, these, as well as final fine filters at the water stage to remove the smaller particles not removed by the initial filter. Such porous filters dictate the need for higher powers necessary for overcoming the resistance created by the filter to transmit the copious quantities of air needed to feed the process. For example, in order to produce only one liter of pure water at even good ambient conditions, over 100 cubic meter of air is required to be cooled, hence in order to be efficient, copious quantities of air must pass through the cooling section with minimum resistance to the air flow.

In the second method, where brine, hydrogels, zeolites and the like are used, they have the drawback that at least three separate processes are required (basically at two locations and sometimes at different times), firstly, to soak up the water vapor, for example using brine, secondly to dry the brine out and thirdly to condense the vapor, generating and collect the water and finally returning the dried material back to the column where soaking is again performed.

Thus, there is a need in the art for improved systems, devices and methods for harvesting water from air, which are highly efficient with respect of water generation efficiency, have low carbon footprints, require minimal maintenance needs, are cost efficient and require low power for operation, so they can preferably operate autonomously, using renewable energy source.

SUMMARY OF THE INVENTION

According to some embodiments, there are provided systems, devices and methods for harvesting water from air, which are cost efficient, have low carbon footprints, require minimal maintenance needs, exhibit high water generation efficiency and advantageously require low power so they can operate using renewable energy sources, such as solar energy and/or wind generated energy.

According to some embodiments, the disclosed systems, devices and methods can continuously generate water from a gas such as air in an efficient, one stage and continuous process.

According to some embodiments, the disclosed methods, devices and systems, can advantageously have several levels of complexity, size and/or power consumption needs for measurably improved power and water generation rate efficiencies. Advantageously, the preference of complexity level used in the systems and methods, depend upon the region and weather (temperature and relative humidity) characteristics where they are utilized, as well as the specific applications, quantities or rates of water that are needed to be generated. Further, the advantageous methods, devices and systems can efficiently operate under various climate conditions, such as, humidity and external temperature.

According to some embodiments, the systems, devices and methods disclosed herein, advantageously inherently provide pure, uncontaminated water, using one integrated, continuously and simultaneously operating stage. Further, the systems, devices and methods disclosed herein, advantageously successfully operate without the need of fine particle filters at the input, or any filter at the water output stage, nor disinfecting means.

According to some embodiments, the devices and methods disclosed herein, can advantageously be added or integrated with any of the existing condensation type technologies for atmospheric water harvesting, in order to vastly improve their efficiencies.

According to some embodiments, the disclosed systems, devices and methods which can continuously generate water from a gas such as air in an efficient, one stage and continuous process, can further be used to dry a gas mixture from water vapor, without any need for the gas mixture to come in contact with the means to dry it (as would be the case if the drying agent was, for example, a desiccant in nature).

According to some embodiments the disclosed systems, devices and methods utilize a molecular selective processing unit, where the required process (for example, Cooling or/and Compression) is specific and is performed only upon the molecules of interest. For example, in the instance where there is a mixture of gasses/fluids, where each have different physical characteristics, and where it is of interest to perform a process on just one of the gas/fluid constituents, the energy required to perform the process will be inherently inefficient if performed on the entire gas mixture. If on the other hand, one could initially, continuously, selectively, separate out the molecule of interest, and then perform the process, just upon the separated molecule species, then the process efficiency will increase.

According to some embodiments, the molecular selective processing unit may include an ion selective membrane that can selectively transport or allow the transport of specific molecules (ions) across their membrane wall at fast rates, the rates being relative to gradients created across their wall. This selective transport may be driven and maintained by providing a continuous gradient by providing differences of physical characteristics on either side of the membrane, for example, pressure, temperature, or concentrations, by continuous removal of the specific molecule after being processed (for example, by condensing it out to its liquid state). According to some exemplary embodiments, an example of such a membrane is Nafion membrane, which can selectively transmit cations across its membrane, but essentially/substantially no other gas species. In some embodiments, another example of such a membrane is Graphene, Graphene Oxide and their composites which have similar characteristics. In some embodiments, another example of such a membrane is a membrane composed of Carbon Nano Tubes (CNT's), which show similar ion selectivity qualities.

According to some embodiments, by utilizing the molecular selective processing unit, since it is highly specific to water vapor, and utilizes a membrane only permeable to water vapor, it can further prevent particle and/or bacterial transmission, hence the resulting generated water are pure water ready for use without further processing, as the generated water have no air born particulate or harmful bacteria that would otherwise have to be removed prior to or after the water is generated.

According to some embodiments, there is provided a device for precipitating water from atmospheric air, the device comprising:
a) a water vapor selectivity unit comprising:
  i) a first side being the air delivery side; and
  ii) a second side, being the water generation side; and
  a molecular selective processing unit, said molecular selective processing unit comprises a selective membrane having a thickness of less than about 200 micron, and one or more support means on a first face of the membrane and/or on a second face of the membrane; wherein said molecular selective processing unit is placed between said first side and second side to separate said first and second sides; and
b) a vapor exchange unit located in the water generation side, said vapor exchange unit is configured to precipitate water from water vapors selectively entering the water generation side from the air delivery side through the molecular selective processing unit.

According to some embodiments, the membrane may be selectively permeable to water vapor and may essentially be impermeable to airborne viruses, bacteria or other air-borne particles. In some embodiments, the membrane is a non-porous membrane. In some embodiments, the membrane is a Nafion membrane. In some embodiments the membrane is a porous membrane impregnated with Nafion solution. In some embodiments, the thickness of the membrane is less than about 100 micron.

In some embodiments, the support on the first side of the membrane comprises a non or semi-porous grid structure. In some embodiments, the non or semi-porous grid structure may further improve the diffusion and contact of water vapor molecules with the face of the membrane.

In some embodiments, the support on the second side of the membrane comprises a hydrophobic porous membrane.

In some embodiments, the support means on the first face of the membrane and/or on the second face of the membrane increase the thermal isolation from either side of the membrane.

In some embodiments, the water generation side of the water vapor selectivity unit may be in a form of a closed cavity. According to some embodiments, the water generation side may be essentially insulated.

According to some embodiments, the condensation and pure water precipitation in the vapor exchange unit is achieved by one or more of: selective water vapor cooling to reach a dew point and consequent condensation of water from the water vapors; selective water vapor compression to reach dew point and consequent condensation; selective water vapor cooling and compression to reach dew point and consequent condensation. Each possibility is a separate embodiment.

According to some embodiments, the vapor exchange unit the vapor exchange unit may include one or more of: a pump, a compressor, a cooling element, or any combination thereof. Each possibility is a separate embodiment.

In some embodiments, the compressor may be selected from: centrifugal compressor, roots and screw compressors, turbomolecular compressor, vein pump, or any combination thereof.

According to some embodiments, the cooling element may be selected from: a Peltier or evaporator with flowing refrigerant, having a relatively large surface area in contact with the water vapors.

According to some embodiments, the water vapor selectivity unit may further include an heat exchange unit.

According to some embodiments, the water may be precipitated on a precipitating surface area in the vapor exchange unit, said precipitating surface area is at least partially made of or coated with hydrophobic material.

According to some embodiments, a continuous water vapor gradient across the selective membrane is maintained throughout the separation process. According to some embodiments, the continuous water vapor gradient may be maintained by the continuous condensing of water from the selective water vapor in the water generation side. In some embodiments, the continuous condensing of water is achieved by one or more of: diffusion or transport of the water vapors to the cooling element and/or compression unit; and/or movement of the water vapor in a closed circulation loop, via the cooling element, to be returned as dry and cold air to the separation membrane.

According to some embodiments, the continuous water vapor gradient may be maintained by creation of pressure drop across the selective membrane and continuous condensation of water from the water vapor and the consequent removal of the generated water.

According to some embodiments, the continuous water vapor pressure gradient may be created using a vacuum pump configured to reduce the pressure in the water generation side and/or a compressor to increase the pressure in the air delivery side.

According to some embodiments the device further includes a vacuum pump configured to essentially create vacuum in the vapor exchange unit; and a compressor physically separating between an upper compartment of the vapor exchange unit and a lower compartment of the water vapor exchange unit, said compressor is configured to increase the water vapor pressure in the lower compartment of the water vapor exchange unit, to thereby allow water precipitation in the lower compartment of the vapor exchange unit, wherein said water precipitation is achieved at room temperature. According to some embodiments, the compressor compresses the water vapors after the vacuum is created in the vapor exchange unit by the vacuum pump.

According to some embodiments the device further include a tap, configured to be closed after the essential vacuum is achieved in the vapor exchange unit, to thereby maintain the vacuum in the vapor exchange unit, to allow the entrance of essentially pure water vapor, through the molecular selective processing unit, such that the water vapor pressure within the vapor exchange unit is equal to the water vapor pressure in the ambient air.

According to some embodiments, the device may further include means to remove latent heat created in the vapor exchange unit, during the precipitation of water.

According to some embodiments, the device may further include a water collection region, such as in the form of a container, configured to collect the pure water generated from the atmospheric air.

According to some embodiments, the device includes a power source. In some embodiments, the power source is a battery. In some embodiments, the power source is a solar cell. In some embodiments, the power source is electric mains power.

According to some embodiments, the device may further include one or more sensors, configured to sense or measure environmental or operating parameters of the device. In some embodiments, the paremeters may be selected from, but not limited to: ambient temperature, relative humidity, barometric pressure, internal temperature in various compartments of the device, air flow speed to and/or within the device, pump level, pump throughput, pressure gradient, cooling level, compression level, compression power, vacuum levels, water removal rate, amount of generated water, or any combination thereof. Each possibility is a separate embodiment.

According to some embodiments, the device may include, further comprising one or more pumps, one or more compressors, one or more condensers, one or more evaporators, or any combination thereof.

According to some embodiments, there is provided a system for precipitating water from atmospheric air, the system comprising one or more devices for precipitating water from atmospheric air; and a control unit configured to control and regulate operation of the one or more devices.

According to some embodiments, the control unit is configured to control one or more operating parameters, said parameters are selected from: internal temperature in various compartments of the device, air flow speed to and/or within the device, pump level, pump throughput, pressure gradient, cooling level, compression level, compression power, vacuum levels, water removal rate, or any combination thereof.

In some embodiments, the control unit may be configured to control operation of the device, based on environmental parameters selected from: ambient temperature, relative humidity, barometric pressure and/or day light time.

According to some embodiments, the control unit is manually operated.

According to some embodiments, the control unit is automatically operated, based on the environmental parameters, to allow the efficient generation of water from the atmospheric air.

According to some embodiments, there is provided a method for precipitating water from atmospheric air, the method comprising:

providing a flow of air to first side of a v, said molecular selective processing unit comprises a water vapor selective membrane, having a thickness of less than about 200 micron, and one or more support means on a first face of the membrane and/or on a second face of the membrane; wherein said molecular selective processing unit is placed between the first side, being the air delivery side and a second side, being a water generation side; and precipitating water in the water generation side, wherein the water is precipitated from water vapors selectively entering the water generation side from the air delivery side only through the molecular selective processing unit.

According to some embodiments, the method may further include thermally isolating the water generation side.

According to some embodiments, the step of precipitating the water is performed by one or more of the steps of: cooling of selective water vapor to reach a dew point and consequent condensation of water from the water vapors; compression of selective water vapor to reach dew point and consequent condensation of water from the water vapor; cooling and compression of selective water vapor to reach dew point and consequent condensation of water from the water vapor. Each possibility is a separate embodiment.

According to some embodiments, precipitating the water in the water generation side is performed on a precipitating surface area, said surface area is at least partially made of or coated with hydrophobic material.

According to some embodiments the method further include maintaining a continuous water vapor gradient across the selective membrane. In some embodiments, the continuous water vapor gradient is maintained by the continuous precipitation of water from the selective water vapor in the water generation side. In some embodiments, the continuous precipitation of water may be performed by one or more of the steps of: diffusing or transporting the water vapors to the cooling element and/or compression unit; moving the water vapor in a closed circulation loop, via the cooling element, to return as dry and cold air to the separation membrane. In some embodiments, the continuous water vapor gradient may be maintained by a step of creating a pressure drop across the selective membrane and continuously condensing water from the water vapor to remove the generated water.

According to some embodiments, the creation of a continuous water vapor pressure gradient may be performed by a step of reducing the pressure in the water generation side and/or by increasing the pressure in the air delivery side.

According to some embodiments, the method further includes one or more of the steps of: compressing, cooling and/or creating vacuum in the water generation side. Each possibility is a separate embodiment.

According to some embodiments, the method may further include the steps of:
creating and maintaining a vacuum in a water vapor exchange unit; and
compressing the water vapors in a lower compartment of the water vapor exchange unit to increase the water vapor pressure is said lower compartment, to thereby allow water precipitation in the lower compartment, wherein said water precipitation is achieved at room temperature.

According to some embodiments, the method includes physically separating between the lower compartment of the water vapor exchange unit and an upper compartment of the water vapor exchange unit, by a compression means.

According to some embodiments, the method may further include removing latent heat created in the vapor exchange unit, during the precipitation of water.

According to some embodiments, the method may further include a step of collecting the pure water generated from the atmospheric air.

According to some embodiments, the method may further include sensing or measuring one or more environmental parameters, selected from: ambient temperature, relative humidity, barometric pressure, or any combination thereof.

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

Other objects, features and advantages of the present invention will become clear from the following description and drawings.

BRIEF DESCRIPTION OF THE FIGURES

Some embodiments of the disclosure are described herein with reference to the accompanying figures. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the teachings of the disclosure. For the sake of clarity, some objects depicted in the figures are not to scale.

DETAILED DESCRIPTION OF THE INVENTION

In the following description, various aspects of the disclosure will be described. For the purpose of explanation, specific configurations and details are set forth in order to provide a thorough understanding of the disclosure. However, it will also be apparent to one skilled in the art that the disclosure may be practiced without specific details being presented herein. Furthermore, well-known features may be omitted or simplified in order not to obscure the disclosure.

According to some embodiments, there are provided systems, devices and methods for generating water from atmospheric air, the systems, devices and methods include a water vapor selectivity unit having a molecular selective processing unit/element which includes a selective membrane having a support on either side (surface/wall) of the membrane, wherein the water vapor selectivity unit is capable of specifically separating water vapor from atmospheric air. Further, there is a vapor exchange unit capable of continuously precipitating/condensing/separating water from the separated water vapor, for further collection of the pure water.

According to some embodiments, there is provided a device for precipitating water from atmospheric air, the device comprising a) a water vapor selectivity unit comprising: i.) a first side being the air supply (air delivery) side and ii.) a second side, being the water generation side; and a molecular selective processing unit, said molecular selective processing unit comprises a selective membrane having a thickness of less than about 200 micron, and one or more support means on the first face of the membrane and/or on a second face of the membrane; wherein said molecular selective processing unit is placed between said first side and second side to separate said first and second sides; and b) a vapor exchange unit located in the water generation side, said vapor exchange unit is configured to generate water from water vapors selectively entering the water generation side from the aid supply (air delivery) side through the molecular selective processing unit.

Figure 1:
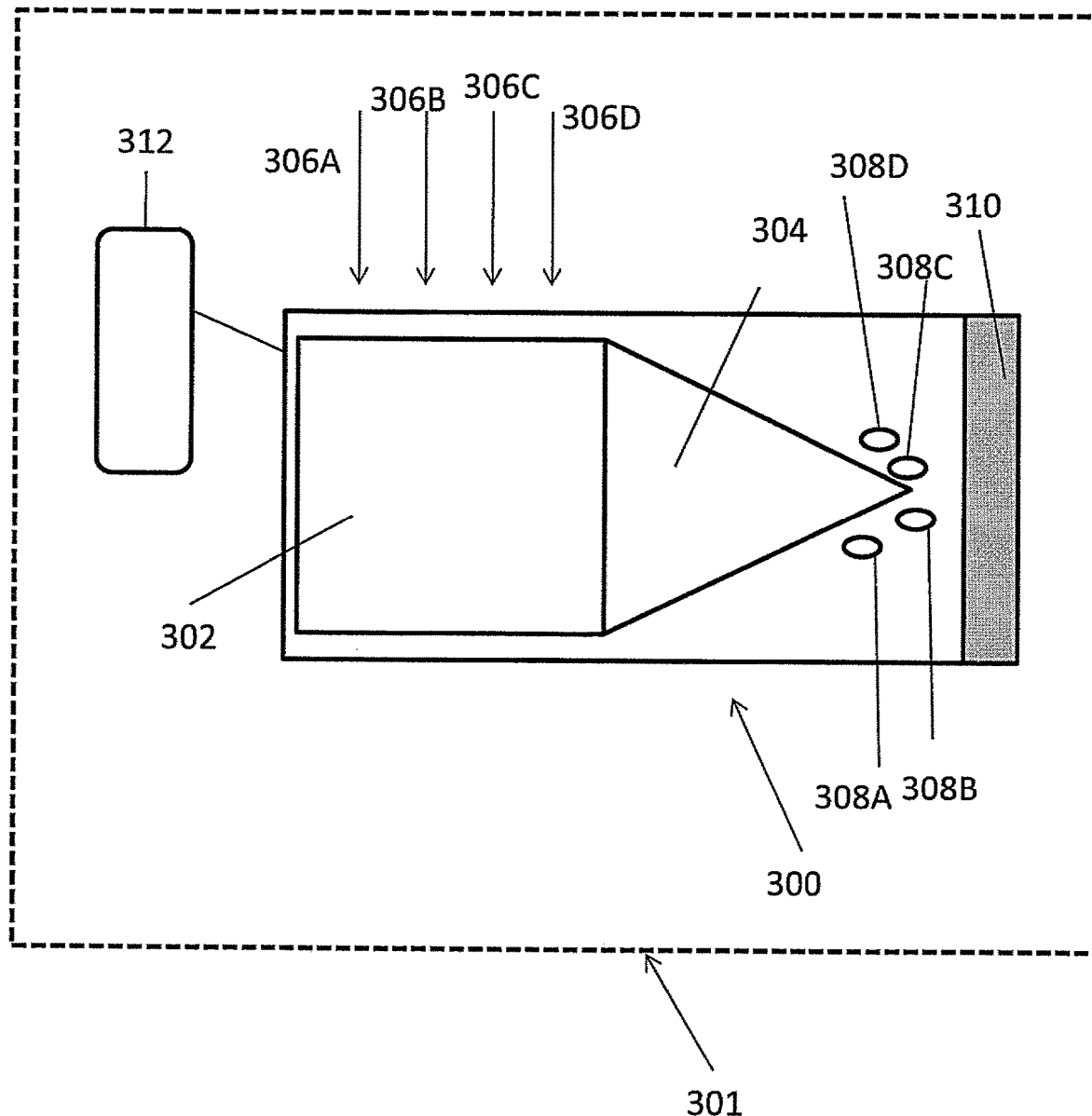
FIG. 1—A Block diagram of a system for generating water from atmospheric air, according to some embodiments.

Reference is now made to FIG. 1, which illustrates a schematic block diagram of a device and system for precipitating water from air, according to some embodiments. As shown in FIG. 1, device (300) includes a water vapor selectivity unit (unit 302) and vapor exchange unit (304). Water vapor selectivity unit is designed to allow the specific separation and of water vapors into the device for further processing (to ultimately result in generation of water). The water vapors are specifically separated from ambient air (represented by arrows 306A-D), via their transfer through a molecular selective system comprised of a thin, selective membrane, having support on at least one of its sides, as further detailed in various embodiments herein. The water vapors consequently entering the vapor exchange unit are further processed to result in the generation of pure water (represented by droplets 308A-D), which can be collected in a reservoir (shown as container 310), for further use, transport, and the like. The Vapor exchange unit can include one or more units/elements that are utilized to generate pure water from the water vapors. In some embodiments, as detailed below, the processing of water vapors may include compression and/or condensation and/or cooling, by suitable means (elements/units), including, but not limited to: compressor(s), cooling elements/units, condenser(s), vacuum pump(s), and the like, or any combination thereof. In some embodiments, dry air may be circulated within the device, for further processing (i.e., removal of residual water). In some embodiments, no dry air is circulated (i.e., returned to the processing unit), and water may be generated, for example, by compression and/or cooling. In some embodiments, the system (301) for generating water from atmospheric air may include a plurality of devices, operating in synchronization in order to increase efficiency and water yield. In some embodiments, the system may further include a remote control unit (312), configured to control operating parameters of the plurality of the devices and/or of any one of the devices individually, so as to ensure the most efficient operating mode, while considering temperature, relative humidity, day light times, and the like, or any combination thereof.

As used herein, the terms "precipitating" and "generating water" may interchangeably be used herein. The terms relate to the specific separation of water vapor from atmospheric air and the further separation/generation/condensation of pure water from the separated ("separated out") water vapor, by the methods, devices and systems disclosed herein. The generated water can then be further manipulated (for example, collected in containers, reservoirs, bottled, and the like).

As used herein, the term "water vapor" relates to the gaseous phase of water.

According to some embodiments, the term "room temperature" relates to the temperature in the environment in which the devices and systems are utilized.

As used herein, the term "condensation" relates to the change of the physical state of water from the gas phase (i.e., water vapor) into the liquid phase. In some embodiments, condensation is the reverse of vaporization, where the liquid turns to gas phase.

According to some embodiments the disclosed systems, devices and methods utilize a molecular selective processing unit, where the required downstream process (for example, Cooling or/and Compression) is specific and may be performed only upon the molecules of interest. For example, in the instance where there is a mixture of gasses/fluids, where each have different physical characteristics, and where it is of interest to perform a process on just one of the gas/fluid constituents (for example, when at least one of the gases/fluids is more volatile than at least a second less volatile species, and generally more important where the more volatile species is of an essentially lower molar concentration than the higher volatile species, and it is necessary to perform a process on just the lower concentration, volatile species e.g. cool, condense out (or possibly evaporate out)). In such an instance, the energy required to perform the process will be inherently inefficient if performed on the entire gas mixture, because it is necessary to be performed on the entire mass of the mixture (for example when cooling) since, most processes like cooling will not be molecule specific. The level of cooling will also be dependent on the initial temperature of the gas mixture, and the temperature it is necessary to cool down to (i.e. dew point), dependent upon initial relative humidity condition of the gas mixture etc. Further, since the required low temperature dew point will be far less than the ambient temperature, further energy is required to remove the latent heat of condensation, since it will not be easily removed by natural means where the ambient temperature is normally far higher than the dew point temperature and where based on thermodynamics, heat energy moves naturally from a hot to cold state, not as in this case from cold to the ambient hot climate, unless further energy is provided. For example, a mixture of Air and water vapor at room temperature would have relative molar concentrations of air 99% and water vapor some 1%. If it was necessary to perform a process on just the water vapor, e.g. condense out the water, by reducing the temperature to its relative dew point, then it is necessary to cool the entire mass of air, though, theoretically it was only necessary to cool the water vapor present in the air, the gas of interest. This rendering the process highly inefficient i.e. cooling 99 molecules of air too in order to cool 1 molecule of water vapor. This becomes even more important if there are large quantities of gas/fluid to be processed, and for example where gasses/fluids are being transported continuously at very fast rates from an input inlet for processing and removal via an appropriate outlet, and where because of the minute percentage of the vapor in the gas, flows of well over 2000 cubic meter/hour are needed in order to generate even just 20 Liters per Hour. In the example above, dew point temperature that has to be surpassed to initiate the process is not even considered, where the lower the initial humidity, the lower the dew point temperature that has to be reached.

According to some embodiments, the disclosed systems, devices and methods advantageously allow initially, continuously and selectively to separate out the molecule of interest, and then perform the process, only upon the separated molecule species, to thereby increase the process efficiency. In some embodiments, in both cases, either on the entire mass or only on the water vapor alone, it is necessary to remove the latent heat of condensation which is specific only to the water vapor when reaching the dew point. In some embodiments, the inevitable removal of latent heat is substantially more efficient in the disclosed systems, devices and methods.

According to some embodiments, the systems, devices and methods provided herein, make use of a molecular selective processing unit which utilizes an ion selective membrane that can selectively transport specific molecules (ions) across their membrane wall at fast rates, the rates relative to gradients created across their wall. This selective transport may be driven and maintained by providing a continuous gradient by providing differences of physical characteristics on either side of the membrane e.g. pressure, temperature, or concentrations by continuous removal of the specific molecule after being processed i.e. condensing it out to its liquid state.

According to some embodiments, example of such suitable membranes include such membranes as, but not limited to: Nafion, which selectively transmits cations across its membrane but essentially/substantially no other gas species; Graphene, Graphene Oxide and their composites; materials using Carbon Nano Tubes (CNT's), and the like. Each Possibility is a separate embodiment.

According to some embodiments, the use of ion selective membrane which is highly specific to water vapor, prevents particle or bacterial transmission, to result in pure water which have no air born particulate or harmful bacteria or other contamination, that need to be removed prior to or after the water is generated. Thus, in some embodiments, the systems, devices and methods disclosed herein to do include a filter system for filtering or preventing transmission of air-borne particles, including, such particles as, but not limited to: dust, debris, pollutants, bio-hazardous contaminants, such as, bacteria, virus; and the like, or any combination thereof. Each possibility is a separate embodiment.

According to some exemplary embodiments, the selective membrane is a Nafion membrane. Nafion membrane is a specific, selective membrane that can transmit and convey cations across its walls in both vapor and liquid states, though smaller gas molecules cannot penetrate its surface. The rate and efficiency of transport across its walls are dependent mainly upon the type of cation, the partial pressure gradient across it, the walls surface area and thickness, water activity, ambient temperature and the flow speed at the wall surface.

According to some embodiments, the selective membrane may be comprised of Graphene and/or Carbon Nano Tubes, though quite different in mechanism (i.e. governed by atomic structure, not chemical composition), have similar characteristics to Nafion (with respect to water vapor transmission), i.e. they can transmit water molecules in vapor or liquid state efficiently, while being quite selective with respect to other gasses like Nitrogen. These membranes can transmit other gasses, but in very low ratios relative to water vapor and water. Additionally, such membranes can be inherently thin, i.e. a single or double layer of arranged atoms or molecules. Hence the transmittance speed of such membranes can be very fast.

Nafion (interchangeable with Nafion™) is a copolymer of perfluoroo-3,6-dioza-4-methyl-7octene-sulfonic acid and Teflon (polytetrafluoroethylene). Specifically, Nafion contains a Teflon backbone with occasional side chains added of another fluorocarbon. The fluorocarbon side chain terminates in a sulfonic acid (—SO3H). The chemical formula of Nafion is: $(C_7HF_{13}O_5S \cdot C_2F_4)$.

The chemical structure of Nafion is Represented by the formula:

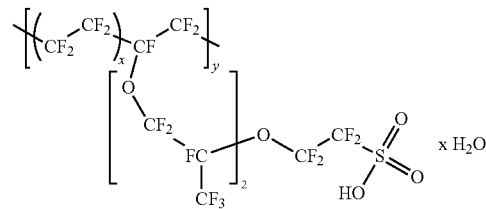

Nafion very readily absorbs water, from the vapor phase or from the liquid phase. Each sulfonic acid group will absorb up to 13 molecules of water. The sulfonic acid groups form ionic channels through the bulk hydrophobic polymer, and water is very readily transported through these channels. Nafion™ functions like a very selective, semi-permeable membrane to water vapor. Once activated, Nafion™ immediately begins to react with its surrounding environment. Moisture is absorbed and exchanged with the surroundings. With the exception of the sulfonic acid groups, all of Nafion is a fluorocarbon polymer. Like most fluoropolymers, it is chemically inert (extremely resistant to chemical attack). Its sulfonic acid groups are immobilized within the bulk fluorocarbon matrix and cannot be removed, but unlike the fluorocarbon matrix the sulfonic acid groups do not participate in chemical reactions. The presence of sulfonic acid makes Nafion selectively permeable to compounds that bind to sulfonic acid. Nafion can function as a cationic exchange resin when exposed to liquids. In the liquid phase, ionic compounds will dissociate into free ions that can interchange with the sulfonic acid group within Nafion, and the ions will permeate very readily through the polymer. Nafion is optimally designed for use only with samples in the gas phase. Compounds do not dissociate into free ions in the gas phase until the temperature exceeds a thousand degrees. Consequently, Nafion does not permit ionic compounds to permeate in the gas phase unless they specifically complex with sulfonic acid. Where very few gaseous compounds complex (bind) with the sulfonic acid, so Nafion is very selectively permeable to water vapor even in the gas phase. Gasses that binds to the sulfonic acid in Nafion will readily permeate through the polymer. These compounds are limited essentially to gases that function as bases (in an acid-base reaction). Not all but most bases contain a hydroxyl group (—OH). For this reason, the following compounds are all actively removed by Nafion: Water (H—OH), Alcohols (R—OH where R is any general organic group), Primary amines (R—NH2) and secondary amines (R1, R2-NH).

In some exemplary embodiments, Nafion may be substantially preferred over other chemical (usually polymeric/ copolymeric) materials which also can transmit water and water vapor for several reasons: Nafion can transmit water vapor several folds faster, faster relative to its thickness than other chemical membranes (Nafion, for example, having water vapor permeability of 450,000 barrer, and selectivity of 4,100,000 $\alpha^{H2O/CH4}$ at 30° C.). In comparison, other membranes several folds lower barrer and selectivity (for example: Poly(2,6-dimethylphenylene oxide) (PPO) has a barrer of 4060 and selectivity of 944 $\alpha^{H2O/CH4}$ at 30° C.; Polysulfone has a barrer of 8000 and selectivity of 44,444$\alpha^{H2O/CH4}$ at 30° C.; Cellulose acetate has a barrer of 10,000 and selectivity of 190000$\alpha^{H2O/CH4}$ at 30° C.; Ethyl cellulose has a barrer of 20,000 and selectivity of 2500$\alpha^{H2O/CH4}$ at 30° C.; Polyether-block-amide (Pebax) has a barrer of 50,000 and selectivity of 6,060 $\alpha^{H2O/CH4}$ at 30° C.); Very thin membrane sheets of Nafion can be made, for example, as low as 27 microns thin membranes; c) Unlike other materials, which are highly dependent upon initial wetting before efficiently transmitting water vapor, this not being so with Nafion, though such wetting can enhance the process; Other materials known in the literature that are water vapor selective are also permeable to gasses like Nitrogen (most common in air) to a measurable extent, where this is not so for Nafion. Further, since Alcohols and amines are not expected to be present in ambient air, the Nafion membrane will be totally selective to water vaper when ambient air is in contact with the Nafion.

According to some embodiments, while Nafion has unique and advantageous characteristics with respect to water vapor transmission (pervaporation), there are several limitations which complicate its use as is, for molecular selective processing and consequently for atmospheric water generation, Such limitations include: The actual thickness of the Nafion membrane is limited by its flimsy mechanical properties, which themselves are also quite sensitive to the ambient conditions. In order to provide mechanical strength and to prevent kinking, an outer braid structure may be added. Other methods for strengthening membrane sheets include using interwoven polymers into the membrane itself for strengthening the sheet; Further complicating the use of Nafion is its inability to be easily connected with other parts or structures; Nafion is highly hydrophilic, and there are applications where it would be preferred at least on one side to be more Hydrophobic. Applications where one collects water (liquid) on one side would necessitate to have the collection side essentially hydrophobic so that water generated can fall or slip off its surface.

According to some embodiments, there is provided a method of using thin film (membrane) of Nafion, a method which can overcome the above mentioned disadvantages, namely, lack of structure, inability to connect simply with other materials, while still using essentially thin membranes of Nafion (or similar) for optimal transition (pervaporation), is provided. In some embodiments, the method is for forming molecular selective processing unit. In some embodiments, such method includes a step of placing ("sandwiching") the thin Nafion sheet membrane, between a highly porous polymer sheet or woven clothe on the water generation side (also referred to herein as "water collecting side", "separated-out vapor side", "collector side"/"vapor side"/ "collection side"), and a non or semi porous polymer or other appropriate solid grid or frame structure on the "air delivery side" (also referred to herein as ("air source side", atmospheric air side"). By performing this step, a mechanical structure and strength is achieved for the Nafion membrane, allowing its successful use in molecular selective processing unit and hence in the water generation devices and systems.

In some embodiments, the woven clothe on the water generation side could be Gas Diffusion Layers (GDL), for example, as used with Fuel Cells.

According to some embodiments, on the water collection side, it is preferred to be more hydrophobic in nature, though could be otherwise and use an appropriate super hydrophobic coating to create the preferred physical characteristic. On the air delivery (source) side, a non or semi porous polymer or other solid grid or frame structure (i.e. not complete sheet) may be used, this to improve the interfacial contact, interaction and absorption of vapor from the air stream flowing in parallel to it. This further, as not to become clogged with particles, dust etc. flowing across this side (unlike on the other side where only pure water vapor encounters its surface).

According to some embodiments, the grid can be so designed as to provide a less laminar flow of the air stream, this so as to improve the diffusion and contact of water vapor molecules with the membrane face.

Figure 2:
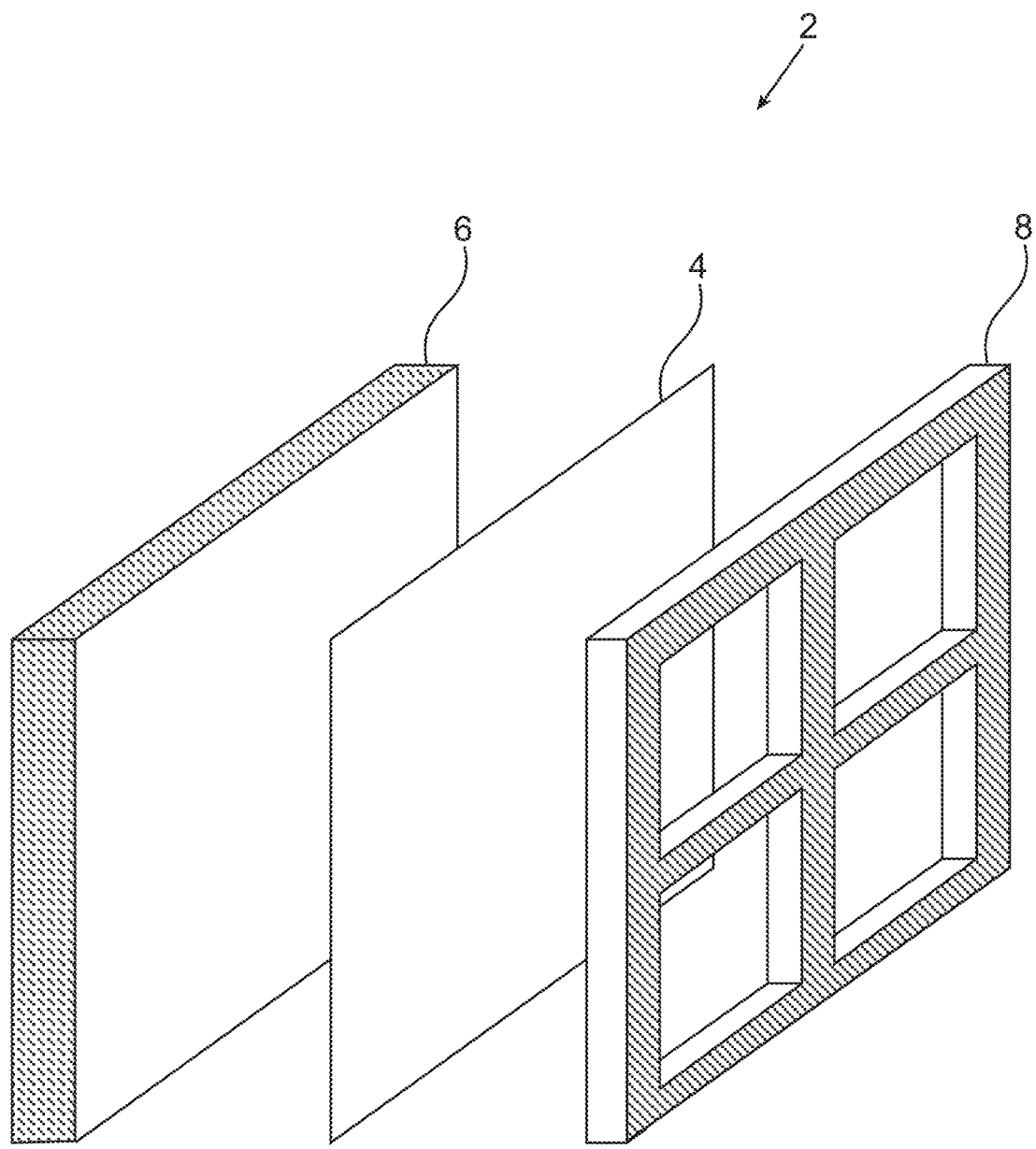
FIG. 2 A schematic illustration of a perspective view of thin membrane sandwiched between full porous membrane on one side and grid support on second side, according to some embodiments.
Figure 3:
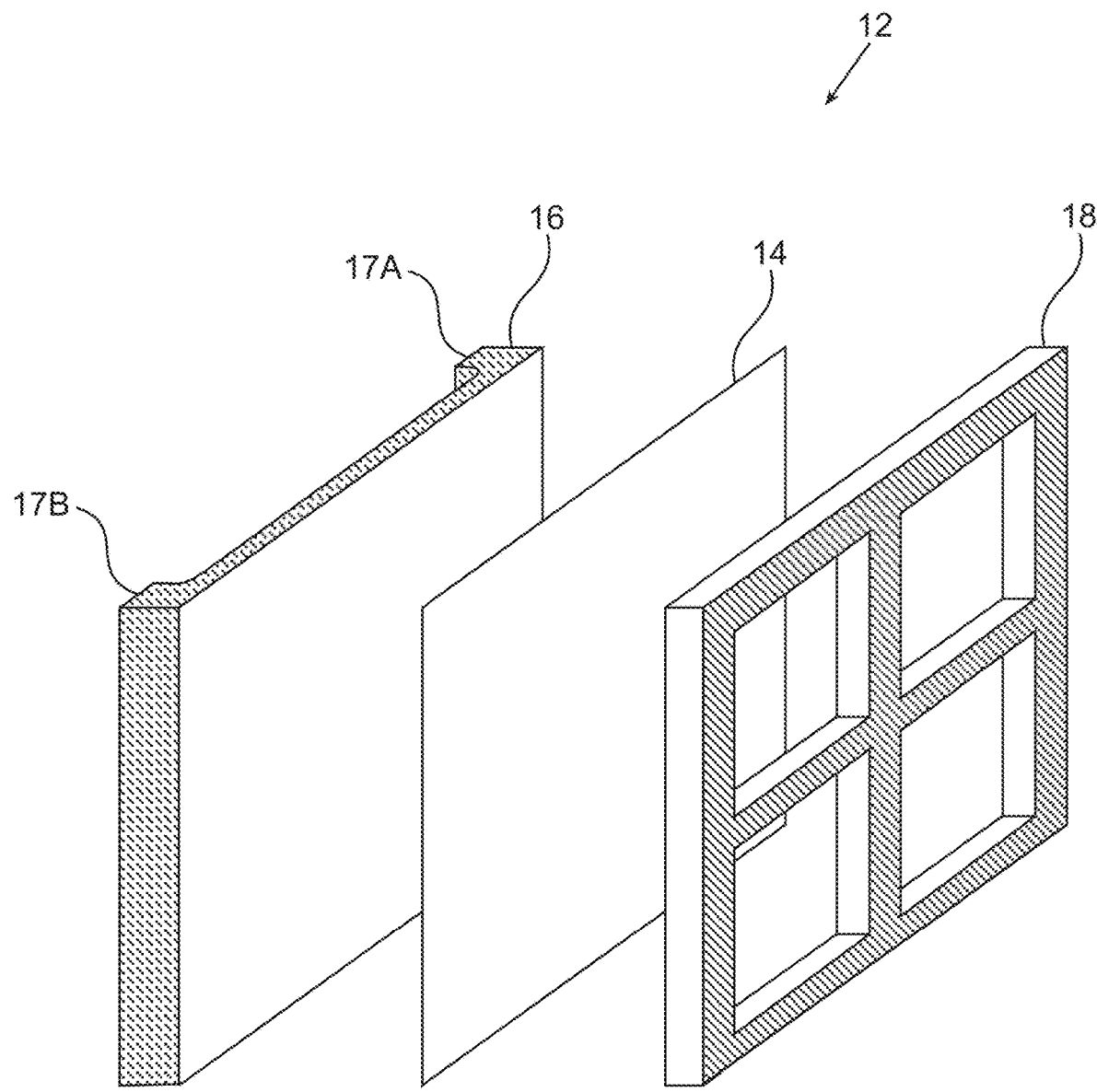
FIG. 3 A schematic illustration of a perspective view of thin membrane sandwiched between full porous thin membrane with strengthened ribs on one side and grid support on second side, according to some embodiments.

According to some embodiments, on the collection side, the porous sheet may be strengthened with ribs of regions with thicker walls, permitting essentially thin porous regions for the majority of the surface, for effective transition of gases like water vapor. Reference is now made to FIGS. 2-5, which illustrate various settings of using thin membrane (for example, a Nafion membrane, having a thickness in the range of 10-150 micron) in a molecular selective processing unit. As shown in FIG. 2, molecular selective processing unit (2) includes a separation membrane (4), which is thin (for example, having a thickness in the range of about 10-150 micron). On one surface of the separation membrane (4), a first support mean (structure) (shown as porous membrane (6)) is attached. The porous membrane may cover at least a portion of the surface of the separation membrane. The porous membrane (that may be in the thickness in the range of about 0.3-1.5 mm), may be made of hydrophobic material and/or may further include a hydrophobic coating, on the surface opposing the contact surface with the separation membrane. On the other surface of the separation membrane, a second support mean may be attached (shown as support grid (8)). Support grid 8 may cover at least a portion of the surface of the separation membrane. The support grid may be made of polymeric material, and may be at least 90-95% open (i.e., only about 5-10% of it's surface may be in contact with the surface of the separation membrane). The attachment between the separation membrane and the first and/or second support means may be performed by any means, such as, for example, gluing, welding, bonding, attaching, and the like. The attachment between the separation membrane and the first and/or second support means may be over the entire surface area of the membrane face or on at least portions of said surface area. Reference is made to FIG. 3, which illustrates molecular selective processing unit, which is similar to that shown in FIG. 2: As shown in FIG. 3, molecular selective processing unit (12) includes a separation membrane (14), which is thin (for example, having a thickness in the range of about 10-150 micron). On one surface of the separation membrane (14), a first support mean (structure) (shown as porous membrane (16)) is attached. The porous membrane may cover at least a portion of the surface of the separation membrane. The porous membrane (that may be in the thickness in the range of about 0.1-0.5 mm, in the center region), may be made of hydrophobic material and/or may further include a hydrophobic coating, on the surface opposing the contact surface with the separation membrane. The first support mean may include reinforcement/strengthening ribs (shown as ribs 17A-B), that are used to reinforce and secure the separation membrane and provide further support to the molecular selective processing unit. On the other surface of the separation membrane, a second support mean may be attached (shown as support grid (18)). Support grid 18 may cover at least a portion of the surface of the separation membrane. The support grid may be made of polymeric material, and may be at least 90-95% open. The attachment between the separation membrane and the first and/or second support means may be performed by any means, such as, for example, gluing, welding, bonding, attaching, and the like. The attachment between the separation membrane and the first and/or second support means may be over the entire surface area of the membrane face or on at least portions of said surface area.

Figure 4:
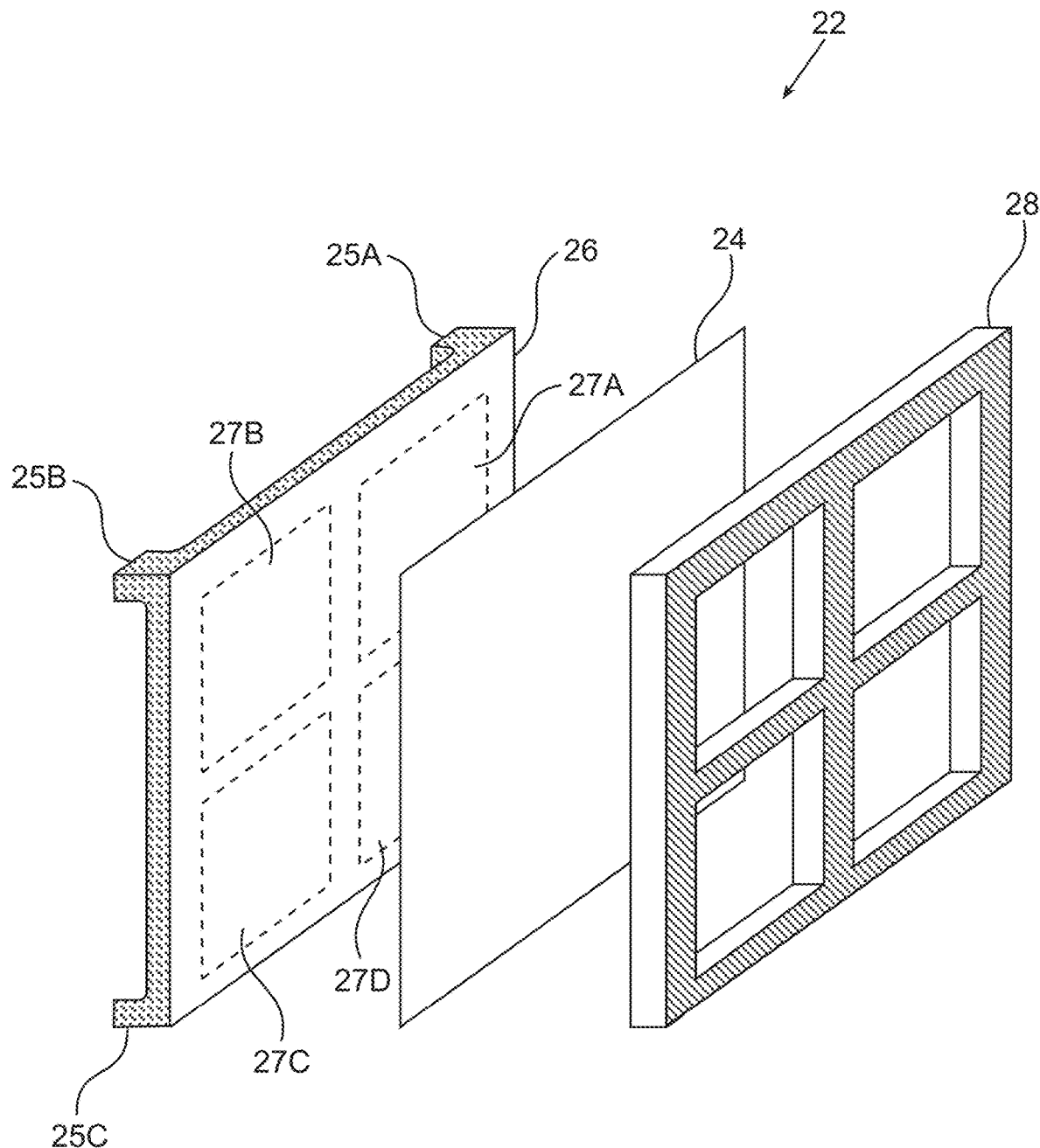
FIG. 4 A schematic illustration of a perspective view of thin membrane sandwiched between a grid porous membrane having strengthening ribs on one side and grid support on second side, according to some embodiments.

Reference is made to FIG. 4, which illustrates molecular selective processing unit, which is similar to that shown in FIGS. 2 and 3: As shown in FIG. 4, molecular selective processing unit (22) includes a separation membrane (24), which is thin (for example, having a thickness in the range of about 10-150 micron). On one surface of the separation membrane (24), a first support mean (structure) (shown as porous membrane (26)) is attached. The porous membrane (26) is in a form of a grid (i.e., having surface areas which do not include a membrane (such as open areas (27A-D)) which therefor covers a portion of the surface of the separation membrane. The porous grid membrane (that may be in the thickness in the range of about 0.1-0.5 mm in the center region), may be made of hydrophobic material and/or may further include a hydrophobic coating, on the surface opposing the contact surface with the separation membrane. The porous grid membrane may include reinforcement/strengthening edges, that may be located at the corners of the membrane (shown as edges 25A-C), that are used to reinforce and secure the separation membrane and provide further support to the molecular selective processing unit. On the other surface of the separation membrane, a second support mean may be attached (shown as support grid (28)). Support grid 28 may cover at least a portion of the surface of the separation membrane. The support grid may be made of polymeric material, and may be at least 90-95% open. The attachment between the separation membrane and the first and/or second support means may be performed by any means, such as, for example, gluing, welding, bonding, attaching, and the like.

Figure 5:
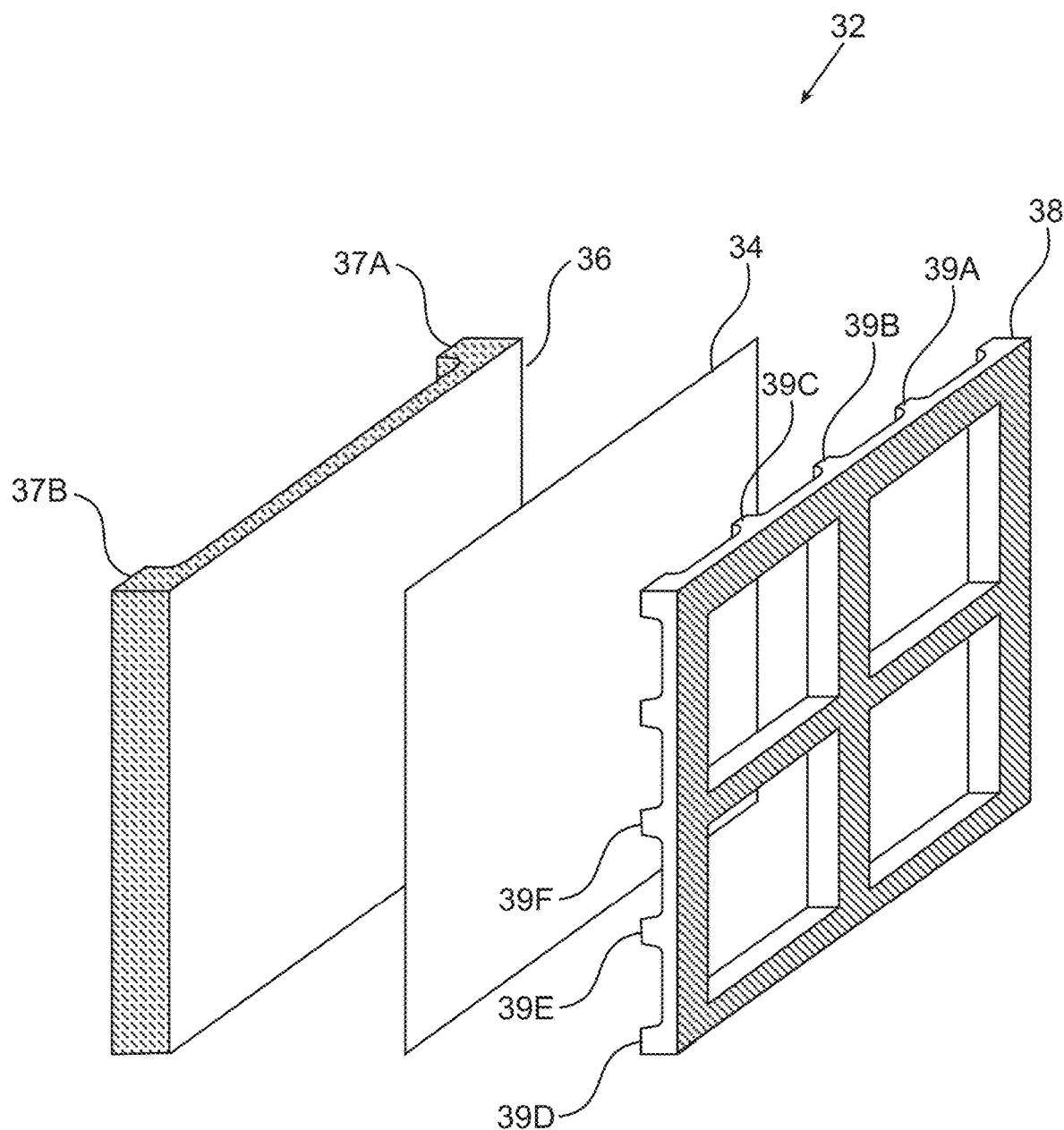
FIG. 5—A schematic illustration of a perspective view of thin membrane sandwiched between porous thin membrane support having strengthened ribs on one side and grid support, with added spaces on the second side, to improve air contact, according to some embodiments.

Reference is made to FIG. 5, which illustrates molecular selective processing unit, which is similar to that shown in FIGS. 2-4: As shown in FIG. 5, molecular selective processing unit (32) includes a separation membrane (34), which is thin (for example, having a thickness in the range of about 10-150 micron). On one surface of the separation membrane (34), a first support mean (structure) (shown as porous membrane (36)) is attached. The porous membrane may cover at least a portion of the surface of the separation membrane. The porous membrane (that may be in the thickness in the range of about 0.1-0.5 mm, in the center region), may be made of hydrophobic material and/or may further include a hydrophobic coating, on the surface opposing the contact surface with the separation membrane. The first support mean may include reinforcement/strengthening ribs (shown as ribs 37A-B), that are used to reinforce and secure the separation membrane and provide further support to the molecular selective processing unit. On the other surface of the separation membrane, a second support mean may be attached (shown as support grid (38)). Support grid 38 may cover at least a portion of the surface of the separation membrane. Support grid (38) may further include along the edges thereof, reinforcement/strengthening ribs (shown as ribs 39A-F), that are used to reinforce and secure the separation membrane and provide further support to the molecular selective processing unit. The support grid may be made of polymeric material, and may be at least 90-95% open. The attachment between the separation membrane and the first and/or second support means may be performed by any means, such as, for example, gluing, welding, bonding, attaching, and the like. The attachment between the separation membrane and the first and/or second support means may be over the entire surface area of the membrane face or on at least portions of said surface area.

According to some embodiments, the Nafion membrane can be welded/bonded/attached to other polymers, with strong bond connection, to form a molecular selective processing unit, which can be in the form of a "sandwich" structure. Hence, by bonding the Nafion in a "sandwich" structure, essentially as described above herein (FIGS. 2-5), with one side/surface/wall of the "sandwich" (the "separated-out vapor side"/"collector side"/"vapor side"/"collection side") being a highly porous polymer sheet (for example, having at least over 40% and preferably over 60% porosity and with pore sizes of about 5 to 1000 microns, preferably 10 to 200 microns), to permit substantially undisturbed vapor flow through the polymer porous structure, while providing mechanical support and strength (for example, about 0.3 to 5 mm thickness) to the Nafion membrane itself, and the other external side/surface ("air source side") being a polymer frame/grid (for example, having a grating of about 5×5 cm with strips/edges of 2 to 5 mm width), which can at least partially cover the Nafion surface. The complete structure ("sandwich") may be welded/bonded along the grid strips/edges, such that the Nafion membrane advantageous attributes can be utilized, by providing a mechanical structure without measurably impairing the water vapor transmission rate. In some embodiments, if using a grid or similar structure on the air source side, it is not essential for this part to be porous, since anyway, about 95% of the Nafion membrane will be open to the air moving across it, and anyway, if used, pores could gradually clog from the particles present in the ambient air. In some embodiments, in such a setting, the mechanical thickness in the collector side may be reduced.

In some embodiments, the thickness of the membrane in the molecular selective processing unit may be in the range of about 1-200 microns, or subranges thereof. In some embodiments, the thickness of the membrane in the molecular selective processing unit may be in the range of about 5-150 microns, or subranges thereof. In some embodiments, the thickness of the membrane in the molecular selective processing unit may be in the range of about 15-130 microns, or subranges thereof. In some embodiments, the thickness of the membrane in the molecular selective processing unit may be in the range of about 20-80-100 microns, or subranges thereof. In some embodiments, the thickness of the membrane in the molecular selective processing unit may be in the range of about 25-80 microns, or subranges thereof. In some embodiments, the thickness of the membrane in the molecular selective processing unit may be less than about 20 micron. In some embodiments, the thickness of the membrane in the molecular selective processing unit may be less than about 30 micron. In some embodiments, the thickness of the membrane in the molecular selective processing unit may be less than about 50 micron. In some embodiments, the thickness of the membrane in the molecular selective processing unit may be less than about 60 micron. In some embodiments, the thickness of the membrane in the molecular selective processing unit may be less than about 100 micron. In some embodiments, the thickness of the membrane in the molecular selective processing unit may be less than about 150 micron. In some embodiments, the thickness of the membrane in the molecular selective processing unit may be less than about 200 micron.

According to some embodiments, because of the structures disclosed above, Nafion sheets as thin as, for example, 27 micron or 56 microns may advantageously be used. Reducing the Nafion thickness as much as possible (for example, to a thickness (width) of about 27 microns), can measurably increase the transport rate across the Nafion wall, enhancing the efficiency of the process. In some embodiments, the thickness of the Nafion membrane in the molecular selective processing unit may be in the range of about 1-200 microns, or subranges thereof. In some embodiments, the thickness of the Nafion membrane in the molecular selective processing unit may be in the range of about 5-150 microns, or subranges thereof. In some embodiments, the thickness of the Nafion membrane in the molecular selective processing unit may be in the range of about 15-130 microns, or subranges thereof. In some embodiments, the thickness of the Nafion membrane in the molecular selective processing unit may be in the range of about 20-80-100 microns, or subranges thereof. In some embodiments, the thickness of the Nafion membrane in the molecular selective processing unit may be in the range of about 25-80 microns, or subranges thereof. In some embodiments, the thickness of the Nafion membrane in the molecular selective processing unit may be less than about 20 micron. In some embodiments, the thickness of the Nafion membrane in the molecular selective processing unit may be less than about 30 micron. In some embodiments, the thickness of the Nafion membrane in the molecular selective processing unit may be less than about 50 micron. In some embodiments, the thickness of the Nafion membrane in the molecular selective processing unit may be less than about 60 micron. In some embodiments, the thickness of the Nafion membrane in the molecular selective processing unit may be less than about 100 micron. In some embodiments, the thickness of the Nafion membrane in the molecular selective processing unit may be less than about 150 micron. In some embodiments, the thickness of the Nafion membrane in the molecular selective processing unit may be less than about 200 micron.

According to some embodiments, the surface area of the membrane (such as, Nafion), required to efficiently remove the vapor from the air can be determined as a function of the rate of air passing parallel to the membrane, the temperature, relative humidity, water activity, dimensions of the cavity (of the water generating side, as detailed below), as well as speed/rate of water removal.

According to some exemplary calculations, one liter of water per hour may be generated from an ambient air flow with the following conditions: Using an area of between 0.5 $m^2$ and 1.0 $m^2$ of Nafion membrane with approximately 25 to 56 microns thickness, are calculated to transmit substantially most of the water vapor content from the air flown parallel to it. This for ventilation air flows of up to 150-meter cube per hour with temperature of 30° C. and 80% Relative Humidity.

According to some embodiments, this separation process may also be a function of the Nafion membrane thickness. To this aim, if the mechanical structures (support) with porous membranes are used in the molecular selective processing unit, it is possible to further reduce the Nafion membrane thickness, and consequently increasing the speed of transmission and hence reducing the load on any of the other parameters, for example, requiring less Nafion surface area, air speed, cooling or pumping loads, vacuum levels maintained, and the like, or any combination thereof.

According to some embodiments, instead of or in addition to connecting and sandwiching the Nafion membrane sheet to the polymer structures, it is possible to impregnate the porous, hydrophobic polymer matrix with Nafion solution, controlling the Nafion thickness after drying. Such solutions having a concentration of 10-20% Nafion are commercially available. The porous polymer sheets may be of hydrophobic or hydrophilic nature (either the same or different on either side (surface) of the molecular selective processing unit), depending upon the purpose for the Nafion to be used.

According to some embodiments, a composite material between Nafion and graphene (and its family of graphene composites) can be used, where the graphene can provide mechanical strength while still acting similar in application to the Nafion.

According to some embodiments, in some instances, where necessary, the added mechanical support in the molecular selective processing unit may also be used to increase the thermal isolation from either side of the membrane, permitting processes that are to be performed on the separated molecules, in particular thermal processes, without losing or gaining energy from the second (opposing) stream side. Further, the porous membrane may be also added to change the physical characteristics of one side of the wall. For example, Nafion itself is highly hydrophilic, though if it is necessary to maintain one side of the Nafion separator to be hydrophobic, then the hydrophobic porous membrane that is providing structure can also provide the required water repelling properties.

According to some embodiments, the systems, devices and methods utilize the unique characteristics of materials like Nafion, Graphene, and the like, or such materials as disclosed in U.S. Pat. Nos. 9,090,766, 8,764,888 and 9,090,766, the content of which is incorporated herein in its entirety. These material characteristics are mainly being the ability to transmit water vapor and liquid water molecules from one side of its wall/surface to the other, when there is a concentration gradient across the wall, in a process designated pervaporation (or ion exchanging). Further, although such materials can transmit the water vapor (and for that matter other specific cation species), it is totally impermeable to air and other gases that are present in the atmosphere.

According to some embodiments, the membrane used (for example, made of any of the materials disclosed above, such as, Nafion, Graphene, oxides or composites thereof) will transmit water vapor if there is a gradient maintained across it. Thus, if a substantially continuous gradient is created and substantially maintained, water vapor can be constantly and selectively transmitted from one position/side/surface (the source) to a second side/position/surface, whereas air (at least the vast majority thereof), is not transmitted. In such a setting, when transmitting ambient, humid air (i.e., air with humidity) from point "A" to "B", the selective membrane can remove and "strip" the air from its humidity content, and consequently transfer the water vapor after passing the specific, selective membrane, to a region outside the initial region between A and B, and permitting movement of the removed vapor to a direction "C", for further specific processing.

According to some embodiments, the membrane utilized in the molecular selective processing unit is a non-porous selective membrane. In such instance, advantageously, membrane fowling is prevented, as the membrane is less likely to be clogged or contaminated and the life span of the membrane is highly extended. This results in reduced mainatace of the device and system.

According to some embodiments, the membrane utilized in the molecular selective processing unit is a porous selective membrane.

According to some embodiments, there are provided devices and systems for generating pure water from air, which utilize one or more of the membrane types disclosed herein, wherein the selected membranes form part of the water vapor selectivity unit of the devices and systems. In some embodiments, the devices and systems can be distinguished both by how they generate and precipitate out the water vapor and secondly, how they maintain the continuous gradient across the specific membrane, a gradient which is necessary to drive the process.

According to some embodiments, the various devices and systems disclosed herein, may be differentiated into several groups and subgroups, based on the level of complexity and methodology they employ. Such groups and sub groups may be divided based on:

I. General method/means for achieving efficient condensation and water precipitation, including: a) selective water vapor cooling to reach dew point and consequent condensation; b) selective water vapor compression to reach dew point and consequent condensation; and/or c) selective water vapor cooling together with compression to reach dew point and consequent condensation.

II. General methods/means for maintaining continuous water vapor gradient across the membrane to drive the process, including:
1. Continuous condensing out of water from selective water vapor and consequent removal of water and hence maintenance of water vapor gradient, by, for example: any one of the following: 1.1. The water vapor naturally diffuses to cooling source or compression unit; 1.2. The water vapor is moved/transported to cooler source or compression unit; and/or 1.3. The water vapor is moved in a closed loop via cooler source to be returned as dry and already cold dry air to membrane (not applicable with compression); and/or
2. Creation of pressure drop across membrane together with continuous condensing out of water from water vapor and removal of water.

III. General methods for improving membrane (such as Nafion membrane) permeation (transport rate); and IV. Water precipitation rate, including determining parameters such as, precipitation surface structure, texture and characteristics of the membrane.

According to some embodiments, utilizing a basic configuration of the water generator devices and systems, the section/unit/element responsible for water vapor selectivity ("water vapor selectivity unit"), includes at least two separated structures (such as in the form of: tubes, conduits, cavities, channels, columns, lumens, and the like, or any combination thereof), that are positioned (for example, lay) next to each other or concentric to one another, and further at least partially separated from each other by molecular selective processing unit (as detailed above). In some embodiments, the membrane of the molecular selective processing unit is further provided with porous, mechanical support as detailed and described above. In some embodiments, the membrane may use a mechanical support on one side, wherein this support has hydrophobic characteristics and where further, the mechanical support supplies a level of thermal isolation characteristics (relative to the membrane wall alone), as further detailed above.

According to some embodiments, the water vapor selectivity element (in the form of a cavity, tube, conduit, channel, column etc.) can have two sides/surfaces/areas/cavities: the side of the porous, hydrophobic, support material (where the water generation process is to be performed) is referred herein as the "water generation side" ("WG"). The other side of the water vapor element, where the membrane itself (for example, made from Nafion or similar material) is substantially open to the environment (i.e. the side where the ambient air is to be passed across) is referred to herein as the "air delivery side" or "air supply side" ("AD").

According to some embodiments, ambient air may be drawn into and driven and impelled through the AD, using any appropriate means, such as, blower, compressor, pump, fan, and the like. In some embodiments, the dimensions of the AD cavity are adjusted/determined based on the flow volume and rate required depending on the rate of water generation requested. In some embodiments, when determining these parameters, it is preferred to provide maximum interaction with the Nafion surface for pervaporation and on the other not to invoke a too large a resistance to the flow, that could result in waste in power.

According to some embodiments, the WG side may further include a cooling and/or compression means. The cooling and/or compression means are used to cool and/or compress the WG side. These means can be placed within the WG side lumen and/or in close proximity to the WG side external wall. Such cooling means may include, for example, means that can be used to cool a closed volume, such as, for example, refrigerator or freezer, with flowing refrigerant, condenser, evaporator and condenser and appropriate fins, or Peltier or similar type cooling system. According to some embodiments, fins or similar structures may be used to provide large, cooling surface areas, which is needed for precipitation generation, where the fins may be directed at angles so that condensed out water falls easily off their surfaces. In some embodiments, the fins may be made from strong hydrophobic materials, or be coated (for example, by spraying) the fins with highly (preferably super) hydrophobic coatings, so as to provide a fin surface to permit condensed-out water to fall from. In some embodiments, the direction of flow of water in the WG side lumen may be directed downwards to utilize gravity force to help remove any condensed-out water. In some embodiments, the fins may be positioned at a distance from each other (for example, at least 1 mm, at least 2 mm, at least 3 mm, at least 4 mm, at least 5 mm, at least 6 mm, at least 10 mm), to permit water droplets to fall freely between the fins.

According to some embodiments, when a Peltier type cooling unit is used to cool the WG, the heat sink side may be placed outside the WG, preferably cooled (removal of heat) by the anyway flowing ambient air (dried or pre-dried (from water vapor)). In some embodiments, when a compressor, evaporator and condenser are used with a flowing refrigerant, the anyway flowing dried air can be used to cool the condenser and used to remove the heat created therein. In some embodiments, the ambient air flow can be used to remove generated heat, to thereby improve efficiency of the water generating system and device.

According to some embodiments, the WG may include any type of heat exchanger used for cooling a gas or liquid flow. In some exemplary embodiments, the heat exchanger may be a heat exchanger, which includes a central cooling core and where the semi dried and cold air leaving the heat exchanger after the first stage of condensation is returned once more through the group of odd compartments of the heat exchanger to pre-cool the incoming water vapor passing within the group of even compartments. According to some embodiments, the cooling to dew point can be achieved by using any one of, or combination thereof, cooling processes known in this art for cooing and condensing out liquids as explained above.

According to some embodiments, the WG may be placed between two AD cavities, or concentrically in respect to the AD, or where the WG encloses the AD or concentrically around it.

According to some embodiments, the porous structure supporting the membrane (such as, Nafion membrane), provides thermal insulation.

According to some embodiments, the ambient air is passed and flown through the conduit/cavity from end to end of the AD, while in the second cavity, the WG is appropriately insulated to maintain temperatures close to the dew point, with high efficiency. Further, as described above, the Nafion membrane and porous structured membrane perform as a thermal insulator (due to the addition of the structural porous membrane).

Figure 6:
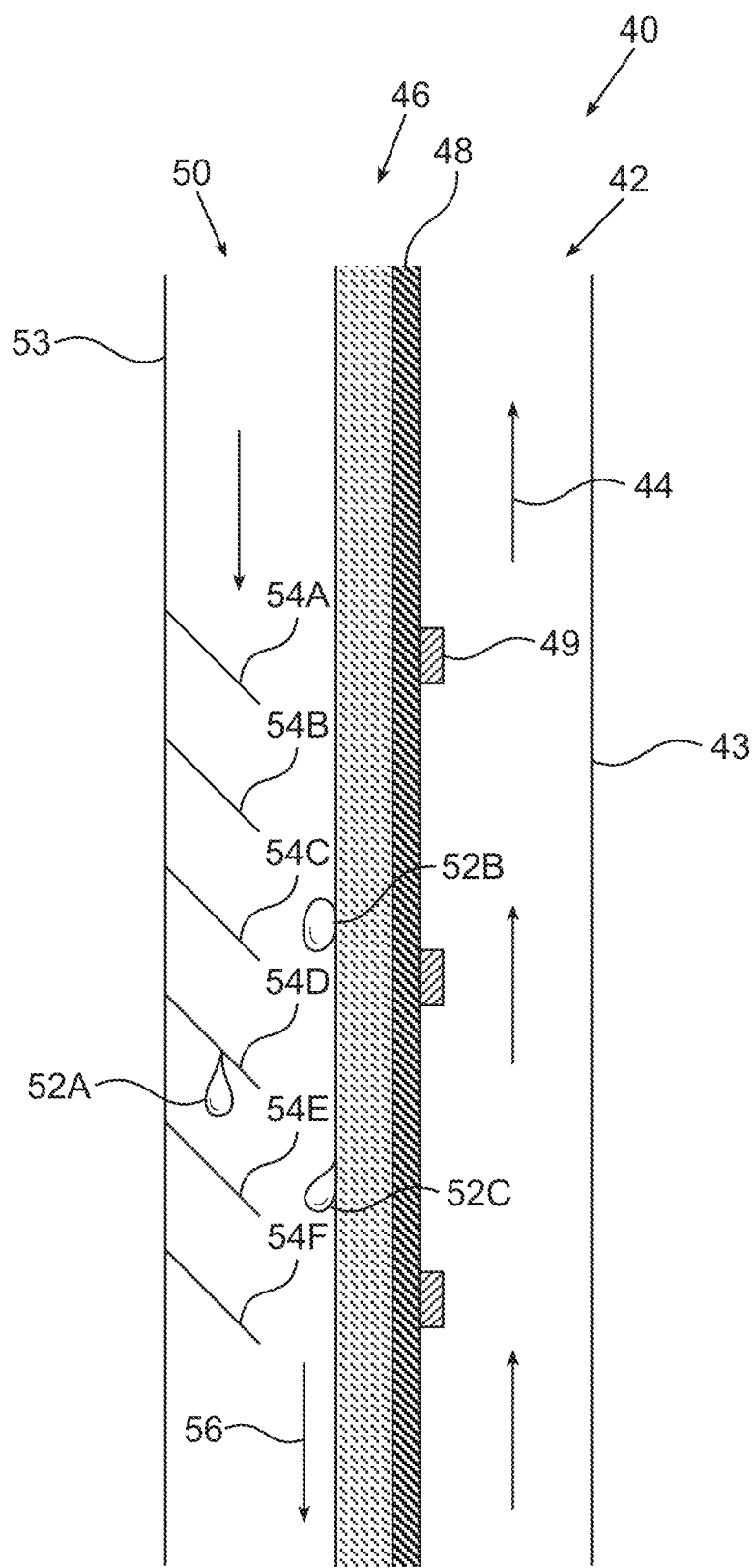
FIG. 6 A general schematic illustration of the basic principal of selective water vapor cooling, according to some embodiments.

According to some embodiments, at an initial stage in the water generation cycle, when the ambient air begins to flow in the AD (e.g. the outer cavity), the W.G. (e.g. inner cavity) may be full of air with similar, equivalent pressure and relative humidity as the ambient air. The cooling means may then be activated. Initially, the cooling means needs to cool down most of the air volume in the insulated WG to a point equal or close to the dew point for that given air content (a function of its initial temperature and humidity), and consequently start the process of condensing-out water from the bound water vapor, now if the condensed-out water is collected and continuously removed using an appropriate means, this process, subsequently reduces the water vapor pressure in the cavity, lowering its water vapor content relative to the AD cavity. Since on the AD side, fresh ambient air is constantly entering and flowing along it, the instantaneous lower water vapor pressure in the WG relative to the AD, will promote a gradient across the Nafion that consequently promotes to maintain the water vapor flow across the membrane (a dynamic steady state), a result of the continuous water vapor flow across the wall where the moving force is the water vapor gradient maintained between both sides of the membrane. Reference is now made to FIG. 6, which illustrates a general scheme of selective water vapor cooling in the water generation (WG) side of a device, according to some embodiments. Shown in FIG. 6 is a cross section of water vapor selectivity unit (40). The water vapor selectivity unit has two opposing sides: a first side, being the air delivery side (AD) (42). The air delivery side is in the form of a cavity (chamber), having an outer wall (43) and inner wall. Through the cavity of the AD side, ambient air flows (marked by arrows 44). The AD chamber is confined by the outer wall (43) on the one side and by a molecular selective processing unit on the other wall. The molecular processing system may have any of the configurations disclosed above (such as, for example, in FIGS. 2-5). The molecular selective processing unit (46) shown in FIG. 6, is made of a selective membrane (shown as membrane 48), having on one surface (facing the AD side) a first support mean (shown as support grid 49) and on the other surface, a second support means (51), which is in the form of a porous membrane, which is preferably made of hydrophobic material and/or include an hydrophobic coating on the external surface thereof. The second side of the water vapor selectivity unit is the water generating side (WG) (50). The water generating side may be in the form of a cavity (chamber), having an outer wall (53) and inner wall, which faces the porous support membrane. The WG chamber is confined by the outer wall (53) on the one side and by a molecular selective processing unit on the other wall. To the WG side, water vapors selectively enter from the AD side, via molecular selective processing unit. In the cavity of the WG side, water (shown as water droplets 52A-C) is generated from the water vapor. The generation of water from the water vapor may be achieved by various means, as detailed herein. In the example shown in FIG. 6, the water can condense on the cool surfaces of the inner wall of the WG, wherein the condensation may be enhanced by use of fins (shown as fins 54A-F). The fins may be made of hydrophobic material and/or coated with hydrophobic material, to provide an enhanced formation of the water droplets on their surface. As further shown in FIG. 6, the water droplets formed can fall to a collection region, by aid of gravity force (marked by direction arrow 56). It should be clear that the schematic cross section shown in FIG. 6, can include any number of such units, which can be situated or positioned at any desired setting and orientation. In some embodiments, between such units, a cooling means (such as cooling refrigerant may be placed, so as to cool the inner cavities of the WG side.

According to some embodiments, if the WG chamber is, essentially thermally isolated, then the vapor further crossing the membrane wall will now be selectively cooled, without need to cool once more the entire mass of air in the WG (already cooled and maintained at low temperature using insulation). At dynamic steady state, the constant flow of air in the AD will be stripped of a part of its bound humidity, passing through the selective membrane to equate the water vapor partial pressure gradient, while in the WG, the cooling constantly removes vapor and generates water. This generation of water from the vapor continuously crossing the walls is hence substantially more efficiently cooled or maintained at the dew point than in the standard condensation process, where cooling of the entire flowing mass of air is required continuously. This can be understood by comparing how much energy would be needed to have cooled to dew point the entire mass of the fast-flowing air in the open cavity (and hence non-insulated) evaporator used in standard water generators, in comparison to cooling only the insulated, non-flowing, concentrated water vapor in the WG of the devices and systems of the invention.

According to some embodiments, the disclosed systems, devices and methods can be at least two times more efficient when ambient temperatures are high and/or Relative Humidity is low, as compared to other systems. In some embodiments, the energy saved using the disclosed devices and systems may achieve an at least two time increase in efficiency when ambient temperatures are high and or Relative Humidity is low, as compared to other systems, in which cooling to dew point is only useful for the initiation of the water generation and when condensation is initiated, the cooled air becomes dryer, requiring further cooling. According to some exemplary embodiments, it is possible to calculate the estimated water vapor gradient. Where if the ambient air flowing in the AD has initial characteristics of 50% relative humidity (RH) at temperature 25 degrees C., with consequent water vapor Partial Pressure ~12 mmHg. If a coolant at 2 degrees Centigrade is passed through the cooler, the partial vapor pressure in the WG would then be, $P_{H2O}$, ~5.3 mmHg for this temperature. There would then be an approximate final vapor gradient between the two chambers of ~12-5.3 i.e. 6.7 mmHg.

According to some embodiments, the flow of vapor between the two cavities (i.e., AD and WG) can depend on several parameters, besides the initial temperature and relative humidity of the ambient air, including such parameters as, but not limited to: the thermal isolation between the two cavities, the air speed flow inside the AD, the membrane (such as, Nafion) thickness, the cooling means surface area, the surface area of the membrane (such as, Nafion) used and which is in contact with the flowing air, the porosity of the hydrophobic structure holding the membrane, and the like, or any combination thereof. Each possibility is a separate embodiment. In some embodiments, the efficiency of cooling and water generation may be enhanced by optimizing one or more of these parameters.

According to some embodiments, it may be further recommended to collect the water via a hydrophilic type membrane, for collection in a separated compartment of the device, a step which may be further improved by adding a level of suction into a water trap and collector.

According to some embodiments, the cooling element may be placed between the molecular selective processing units, and where the water vapor that is selectively transferred to the WG side, as driven by the gradient, reaches the cooling element via natural diffusion of the water vapor within the WG. In some embodiments, using this basic structure/configuration, the size and volume of the cooling region of the WG is limited by time for diffusion as well as gradients in water generation efficiency (efficiency higher close to the membrane, and lower further away), though this movement and flow of water vapor in the WG may be improved by molecular movement provoked by the thermal gradients between the membrane and cooling source. Also, with this basic configuration, it is further dependent on the insulation efficiency of the molecular selective processing unit (Nafion structure), and where there is a possibility for water condensation in the Nafion structure itself, reducing the efficiency of driving the process and stripping of the air flow in the AD from all its bound humidity.

According to some embodiments, continuous condensing out of water from selective water vapor and consequent removal of water and hence maintenance of water vapor gradient, is achieved by natural diffusion of water vapor to cooling source or compression unit, as detailed above herein. 1.2. The water vapor is moved/transported to cooler source or compression unit; and/or 1.3. The water vapor is moved in a closed loop via cooler source to be returned as dry and already cold dry air to membrane (not applicable with compression);

According to some embodiments, in another structure/configuration, diffusion alone is not used in the transport the water vapor for cooling. In order to reduce the previously explained limitations of the WG section size and dimensions, limited by the diffusion speed of the water vapor from membrane to cooler region, air movement is achieved by adding a mechanically moving/stirring part to the cavity, to mix the cavity air mixture, thereby reducing the buildup of a natural gradient between the membrane and cool air.

According to some embodiments, continuous condensing out of water from selective water vapor and consequent removal of water and hence maintenance of water vapor gradient, is achieved by moving/transporting the water vapor to cooler source or compression unit.

According to some embodiments, the vapor exchange unit (also referred to as "VEU"), included in the devices and systems, enables the generation of pure water from the separated-out water vapor. In some embodiments, the VEU may be an integral part, or in close proximity to the water vapor selectivity unit, for example, in the same region/cavity/compartment as the molecular selective processing unit. As detailed above, in such a setting, the water vapor separation and the condensation out of water from the specifically separated water vapors are being performed in close proximity, relying, for example on diffusion to form vapor gradient.

In some embodiments, as further detailed below herein, the VEU may be separated from the water vapor selectivity unit and be placed in a separate region/compartment/position such that the separation is performed by one unit (water vapor selectivity unit) at one region and the water generation from the water vapors is performed at a second position/region by the second unit (VEU). In some embodiments, to continuously generate water from the selective water vapor and consequent removal of water and hence maintenance of water vapor gradient, an active flow cycle may be used, such that water vapor is moved in a closed loop via cooler source to be returned as dry and already cold dry air to the membrane.

According to some embodiments, there is thus structure/configuration that may be included in which cooling is used to condense out the water vapor in the VEU, and the water vapor is moved in a closed loop via cooler source to be returned as dry and already cold dry air to the membrane of the water vapor selectivity unit.

According to some exemplary embodiments, the WG may be thus basically divided into two regions: a) a region where water vapor is driven across the selective membrane; and b) a region where cooling is provided for vapor condensation.

According to some embodiments, the water vapor selectivity unit may be structured so that ambient moist air follows along a path, that can be at about 180° to that of the cooled air in the WG, i.e. in a directly opposing direction. This is designed so as to optimize the transmission of the water vapor, by creating an optimal, moving gradient along and between the two opposing flows. If the two flowing media are the 180°, the structure may become complex, since both air flows must be maintained separate, and hence directed away from each other after leaving the region where vapor transmission occurs, such a complex structure would also add size and flow resistance to the unit. Hence, in some embodiments, the two opposing flows may have an angle of about 135+/−20° between them, to optimize the gradient driven water vapor transmission while permitting separation between the two different gas stream paths before and after where the transmission occurs.

In some embodiments, the water vapor selectivity unit is structured such that the direction of flows are at about 90° degrees (orthogonal) to each other. In such a setting, ambient and moist air is flown in a direction parallel to the ground plain (horizontal), along the AD's while the concentrated vapor in the WG has a flow downwards towards the ground (vertical path). The plurality of cavities, provide high membrane surface areas for vapor transmission in compact structures. The cavities may be 3 to 25 mm width and preferably 4-7 mm, so that on one hand, they do not create to high resistance, while on the other, they permit enough membrane to air contact for water vapor pervaporation.

Figure 7A:
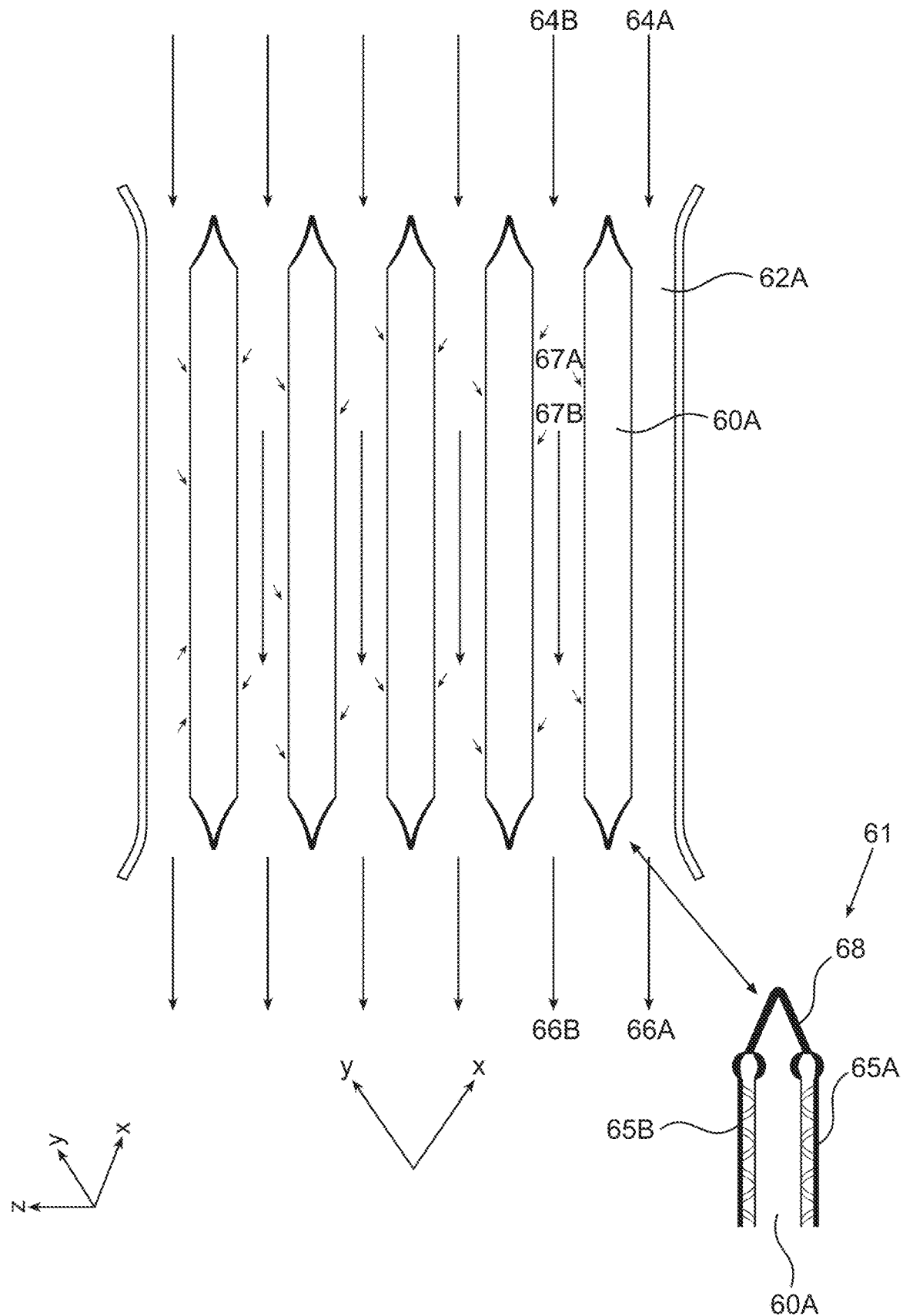
FIG. 7A—A schematic illustration of a cross section view along the X-Y plain of water vapor selectivity units, according to some embodiments.
Figure 7B:
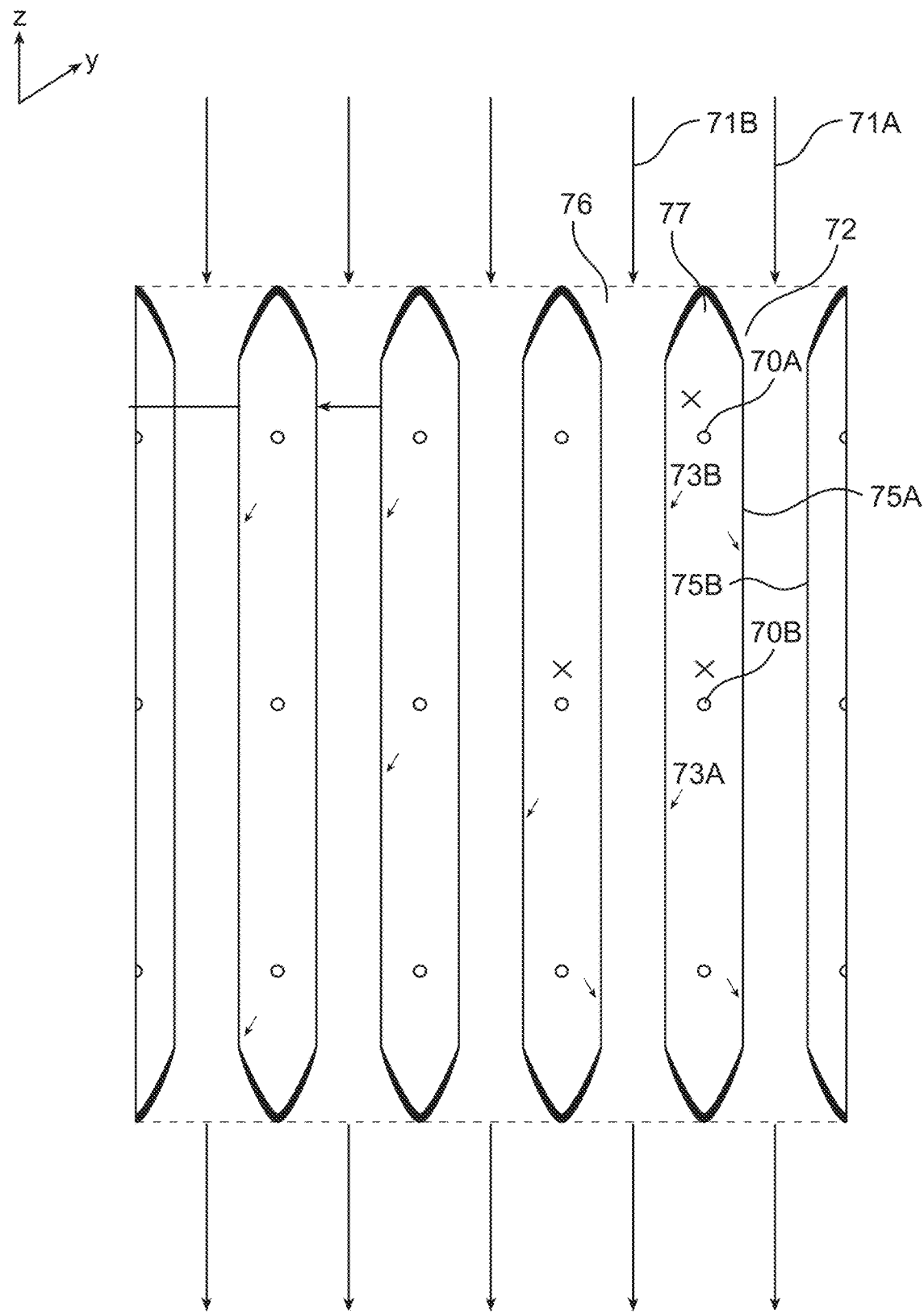
FIG. 7B A schematic illustration of a cross section view along the Z-Y plain of water vapor selectivity units, according to some embodiments.

Reference is now made to FIGS. 7A-B, which illustrates cross sections of water vapor selectivity units, according to some embodiments. As shown in FIG. 7A, which is a cross section view along the X-Y plain, moist (ambient or atmospheric) air (represented by arrows 64A-B) enters the water vapor selectivity units. Reference is made to exemplary representative unit (61), which includes molecular selective processing units (65A-B), defining an enclosed cavity (60A, which is the water generating side), into which water vapor can selectively enter from the air delivery side (62A). The walls of the enclosed cavity may be closed at their end by a suitable seal (shown as seal 68), which may be, for example, aerodynamic to enhance air flow. The dryer (atmospheric or ambient) air (represented by exemplary arrows 66A-B) is flown away from the units. The water vapors (represented by small arrows 67A-B) enter the WG cavity, where they are further processed (as detailed below), to produce pure water. The concentrated vapor in the WG has a flow downwards towards the ground, to further enhance water collection. As shown in FIG. 7B, which is a cross section view along the Z-Y plain, moist (atmospheric or ambient) air (70A-B) is flowing in the x axis, perpendicular to the dry, cold air (represented by arrows 71A-B), which is flowing in the direction of the Z axis. Molecular selective processing units (shown as 75A-B), allow separation of water vapors (represented by small arrows 73A-B) from the air delivery side (77), to the water generation side (76).

In some embodiments, to remove the water vapor from one region to another, a closed loop of moving air is promoted using a pump or fan or other appropriate means. The use of such closed loops are advantageous for several reasons, including: enabling the use of a much larger and appropriate cooling system with large surface area for condensation promotion; Simpler to provide insulation for the region where condensation occurs; Fast air movement and removal of water vapor for producing the continuous gradient for driving the process in the membrane region, while providing a slower and evenly distributed flow in the condensation region again increasing condensation efficiency and reducing the possibility of water build up in the membrane region.

According to some embodiments, the above structure, in particular the AD region can be duplicated, so that an entire system may include a set of structures for greater water generation quantities. In further embodiments, some of the power generating sections (units), such as pumps may, use one unit to serve several vapor exchange units, for efficiency optimization.

Figure 8:
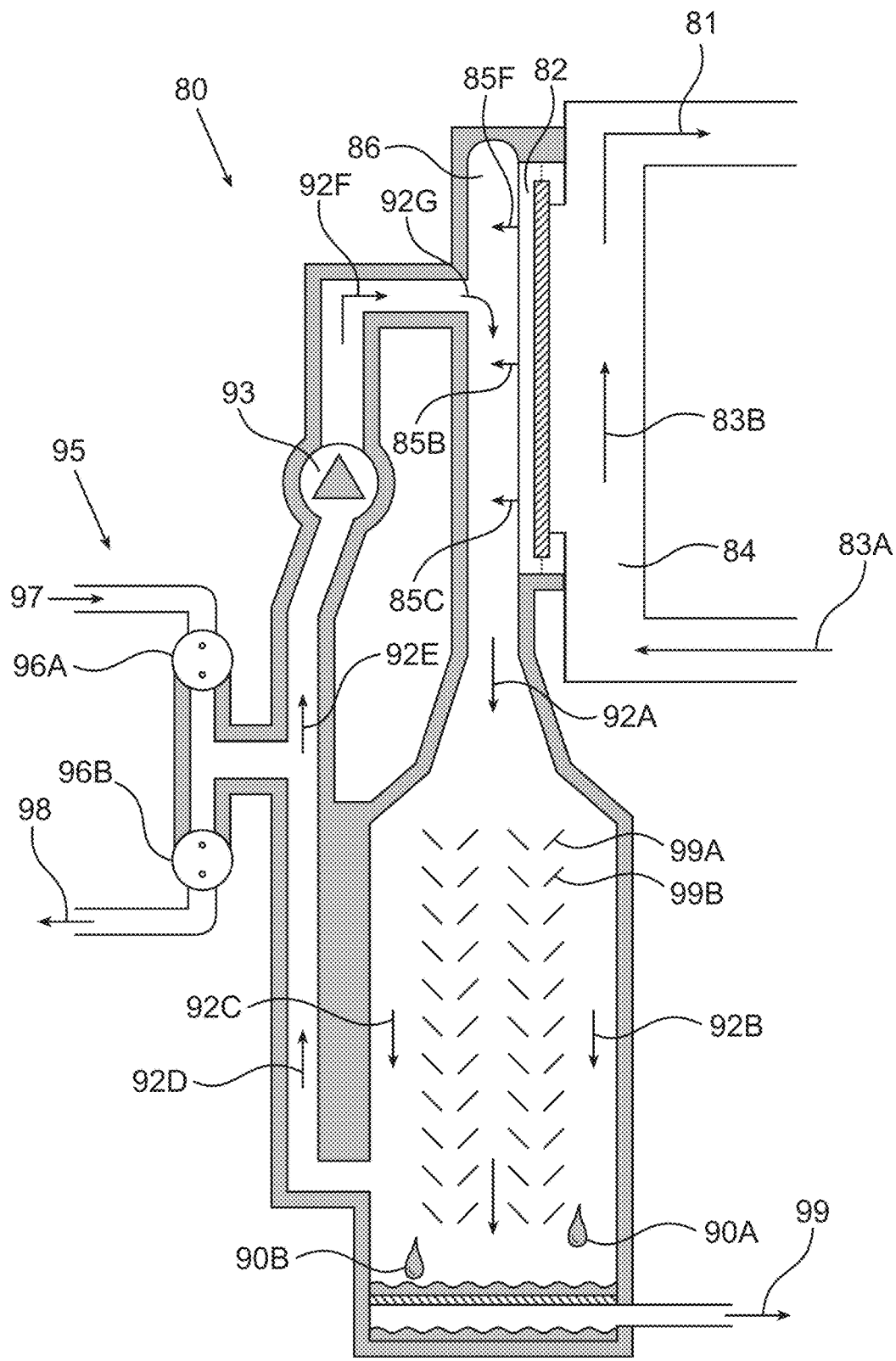
FIG. 8 A schematic illustration of a general structure of a water harvesting device, according to some embodiments.

Reference is now made to FIG. 8, which illustrates a schematic device for precipitation of water from atmospheric air, according to some embodiments. As shown in FIG. 8, device (80) includes water vapor selectivity unit which includes a molecular selective processing unit (82), an air delivery side (84), from which atmospheric air flows (represented by arrows 83A-B). Water vapors (represented by arrows 85A-C) from the atmospheric air, when in contact with the selective system (82) are separated from the air and enter the water generating side ((WG), 86) via the molecular selective processing unit. The dry air, having the water vapors separated therefrom, flows away (represented by arrow 81). The water vapor in the WG are cooled and can condense to water droplets (shown as droplets 90A-B). The water droplets are collected (water collection, 99). The WG in FIG. 8, includes two regions: a region where water vapor is driven across the selective membrane and a region where cooling is provided for vapor condensation. The cooling and condensation region may include one or more cooling means and surfaces, such as, for example, fins (shown as exemplary fins 99A-B), which can provide an increased and enhanced surface area for water condensation. As shown in FIG. 8, to remove the water vapor from one region to another, a closed loop of moving air (marked by arrows 92A-G) is promoted using a pump (shown as pump 93). Further shown is barometric pressure regulator 95, which can control the pressure inside the WG, by regulating the entrance of air (marked by arrow 97) or exit of air (marked by arrow 98) from the closed and insulated system. Pressure regulator 95 can include valves (shown as valves 96A-B), which can be, for example, solenoid valves, to control the entrance of air into the system, so as to maintain inside pressure. In some embodiments, the WG is insulated (for example, along its external walls), to reduce energy expenditure According to some embodiments, to further enhance the systems and devices, it is preferred that the dried, water-removed and cold gas returning through the pump, from the cooling section and back towards the vapor selectivity unit (membrane exchange unit), have a slightly increased temperature, e.g. an approximate maximum 2 degrees relative to the cooling region. This before reaching the separation membrane, this in order to reduce the possibility that water is generated and condensed out at the membrane surface, which could impede and hinder the water vapor transfer process across the membrane. This added temperature may occur naturally from the heat crossing the membrane wall, and in some embodiments, it may be monitored to prevent this issue.

In some embodiments, the volume of the cavity used for cooling may be far larger than the volume of the return route via the pump to the vapor selectivity unit (membrane separating region).

Figure 9:
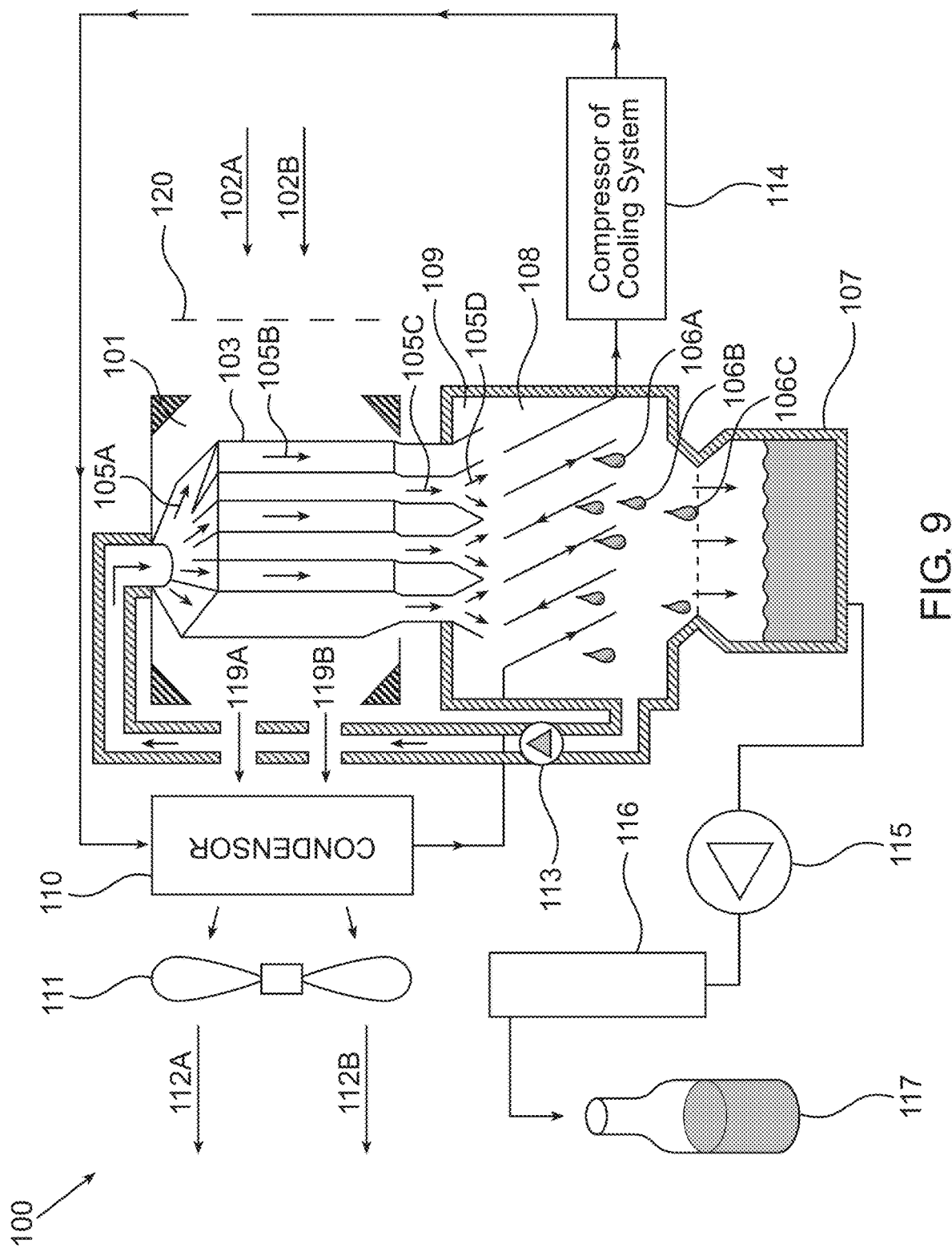
FIG. 9 A schematic diagram of a device for water harvesting, according to some embodiments.

Reference is now made to FIG. 9, which shows a device for water generation, according to some embodiments. As shown in FIG. 9, device 100 into which, ambient air (moist air, represented by arrows 102A-B) flows in via the water vapor selectivity unit (103), to ensure that only water vapors (exemplary water vapors are represented by arrows 105A-D), enter the water generation region (109), which is an isolated cavity. In the evaporation region of the cooling system (108), water can cool and condense to form pure water droplets (represented by exemplary droplets 106A-C) which are collected in water storage 107. The generation of water is achieved by, for example, cooling and condensation processes. The cooling system/unit includes a condenser (110), and optional fan (shown as fan 111), both of which can aid in the removal of warm dried atmospheric air (represented by arrows 112A-B), as well as removing heat from the cooling system condenser. Atmospheric dry air, striped of water vapors is represented by arrows 119A-B. The device further includes a pump (shown as pump 113), controlling cooled dry air circulation in the WG. A compressor (shown as compressor 114), which is part of the cooling system is used for compressing the refrigerant. In the evaporator section of the water vapor selectivity unit, water droplets may form on the surface area, which may be in the form of fins. In some embodiments, the evaporator section can be a heat exchanger with internal cooling core source. In some embodiments, cooling may be achieved by using a Peltier, solid state cooling system. Optionally, the device may further include a coarse filter (shown as filter 120), which can be used to safeguard the separation membrane surface from damaging particles and contaminants. The device may further include a second pump (shown as pump 115), for removing the generated pure water to a second storage unit (such as, bottle 117), optionally, to add ions (116) to the water. In some embodiments, as illustrated in FIG. 9, the device is advantageous as the evaporation stage is performed only on the separated-out water vapors, and not on the flowing mass of ambient air, as would be in an open, non-insulated cavities. In the disclosed device, only the water vapor separated from the ambient air requires cooling and this is performed in an insulated enclosure.

Figure 10:
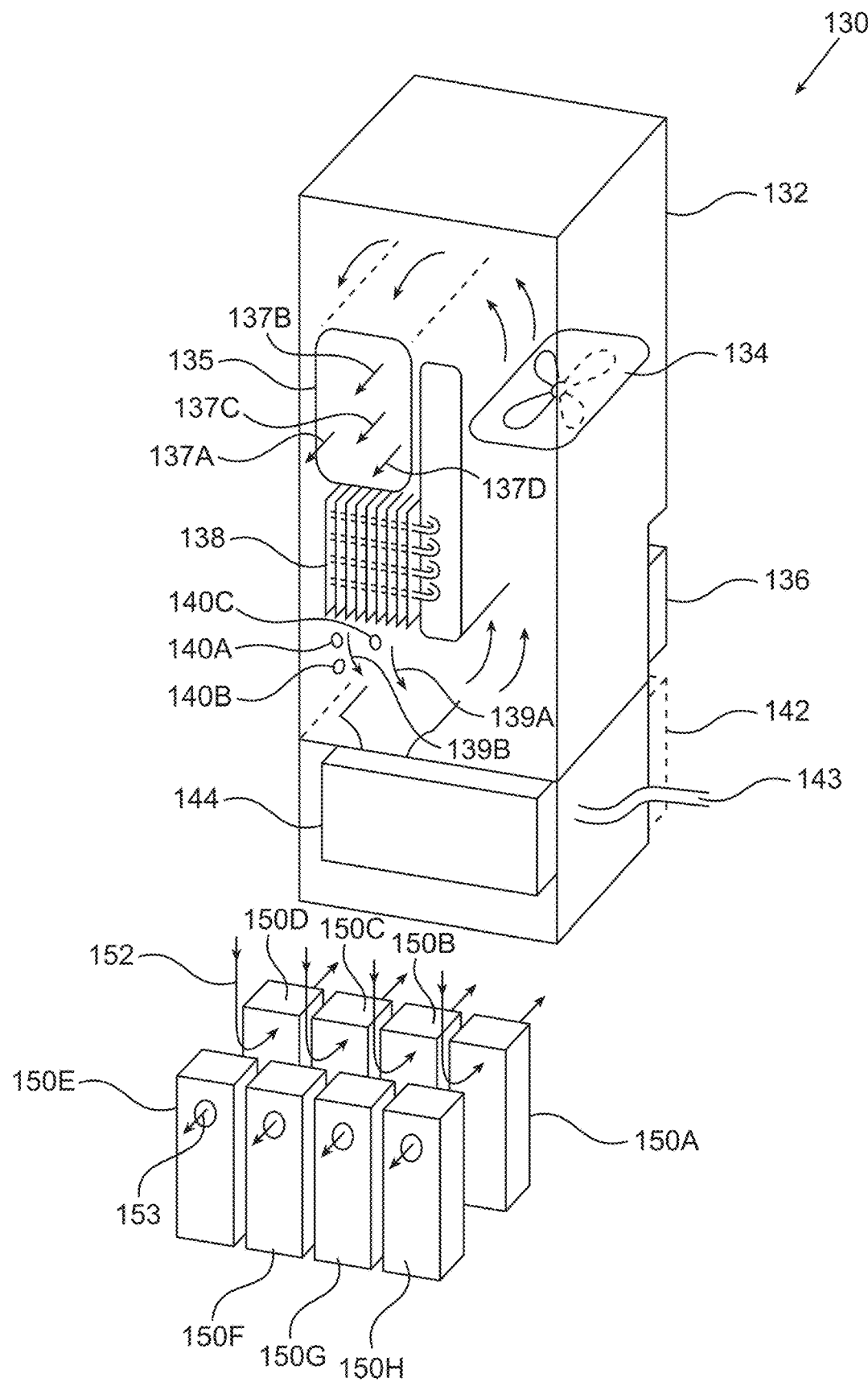
FIG. 10 A schematic illustration of a device and system for water harvesting, according to some embodiments.

Reference is now made to FIG. 10, which depicts a perspective view of a device and system, according to some embodiments. As shown in FIG. 10, device 130 includes an isolated housing (shown as housing 132). In some exemplary embodiments, the housing may be in the size of about 80-100 cm×100-120 cm×160-200 cm, for example, 90×110×180 cm). The device further includes an air/vapor circulating unit (shown as circulating unit 134), which drives air and vapors, via the vapor separation unit (135), which ultimately specifically separates water vapor from the ambient air. Dried ambient air (represented by arrows 137A-D) is removed from the device. Water vapors (represented by arrows 139A-B), cooled by cooling unit 138, which is activated/controlled by cooling system (136, which may include a compressor and/or condenser) are condensed to generate pure water droplets (shown as water droplets 140A-C). The device further includes a vacuum pump, to maintain/control pressure in the water generating region of the device. The pure generated water can be collected in reservoir (144) and/or may further be removed to external storage (143). As further shown in the lower panel of FIG. 10, several devices (shown as devices 150A-H) may be arranged/stacked to form system for generating water, wherein exemplary arrow 152 represents moist (ambient) air going into the device(s), and exemplary arrow 153 represents dry air (stripped of water vapor), leaving the device(s). In some embodiments the capacity of such system in generating water is enhanced. In some exemplary embodiments, such system can produce about 120-240 litter of water per hour (2500-5000 litter per day), at a temperature of 27° C. and relative humidity of 55%. In some embodiments, at higher relative humidity and temperature, the production rates are further increased.

According to some embodiments, the efficiency of water generation may be further enhanced by increasing the water vapor gradient across the membrane (and hence the driving force of the process and consequently the water generation efficiency and rate). This can be achieved by decreasing the absolute air pressure in the W.G. cavity and, consequently, decrease of water vapor partial pressure within the cavity causing an increase in the water vapor partial pressure gradient across membrane, by reducing the pressure in the WG relative to the air pressure in the AD. For example, reductions in total pressure, for example to 500 mBar or less can be made to improve the $H_2O$ vapor gradient across the selective membrane. In some embodiments, these under pressures are created only periodically and maintained, since the system is essentially a closed system, with essentially no new air entering via the molecular selective processing unit, and generally only being lost during removal of water condensed out by possible leaks.

In some embodiments, the water vapor pressure gradient can be either created by reducing the pressure in the WG or by increasing the pressure in the AD, using compression. In some embodiments, reducing the pressure in the WG is more energy economical.

According to some embodiments, the AD can flow air from the atmosphere, at ambient pressure or close to ambient pressure, while the WG may be connected to a vacuum pump and where the WG is maintained at pressures substantially lower than that in the AD, even close to the vapor pressure. Though reducing still further the WG pressure to even below the vapor pressure of water for the temperature of the air used at that time, would provide an even higher gradient, this advantage may be outweighed by the fact that the cooling temperature would need to be cooled further, since at these low pressures, the water would remain in its vapor state and not condense out. Such limitation may be obviated by adding the use of compression.

According to some embodiments, the actual vacuum level chosen is dependent on the tradeoff between the rate of water to be generated, versus the energy required to maintain the lower pressures and necessary lower cooling temperatures when the final pressures achieved and used are lower than the vapor pressure. Where the energy required will be relative also to the low leakage design and size. In some embodiments, in vacuum levels of the order 100 to 500 mbar, even periodic pumping may be sufficient, thereby advantageously reducing power needs.

According to some embodiments, the lower the absolute barometric pressure in the WG chamber is maintained, not only is the gradient increased to promote and maintain a continuous flow of vapor from the AD to the WG side, but since no air can pass from the AD to the WG (only water vapor can), the gas mixture in the WG increases its water vapor concentration, to levels which are far higher than in the ambient air. In ambient air, the vapor pressure in most positions in the globe is less than 1% of total pressure or concentration, whereas in the WG, while decreasing the barometric pressure, the vapor pressure concentration of the remaining mixture is increased to above 50% and further close to 100%. When comparing this to the original 1%, the cooling efficiency of the device using such selective cooling is vastly increase. In some embodiments, this process is created and driven by the condensation out and removal of the generated water and the continuous or periodic elimination of air by the pump activity and the penetration of new water vapor entry via the selective membrane into the WG cavity (chamber). This process further enhances the efficiency of water generation, such that substantially all the molecules cooled are only the selected, specific water vapor molecules that are able to cross the molecular selective processing unit, i.e. selective and specific cooling. In some embodiments, the devices, systems and methods disclosed herein use a selective and specific cooling, thereby vastly increasing the efficiency thereof.

According to some embodiments, since the water vapor is also continuously being removed from the WG cavity (by cooling and consequent condensing out), together with the continuous or intermittent operation of the vacuum pump to which it is connected, the gradient of vapor pressure between the two cavities, will remain such that a constant flow of vapor removal will continue. If sufficiently efficient, then the ambient air flow may be stripped/removed completely of its water vapor content. In some embodiments, such settings can be implemented not only for water generation, but also when the objective is to dry a gas mixture, where there are applications where close to 100% drying is necessary.

Figure 11:
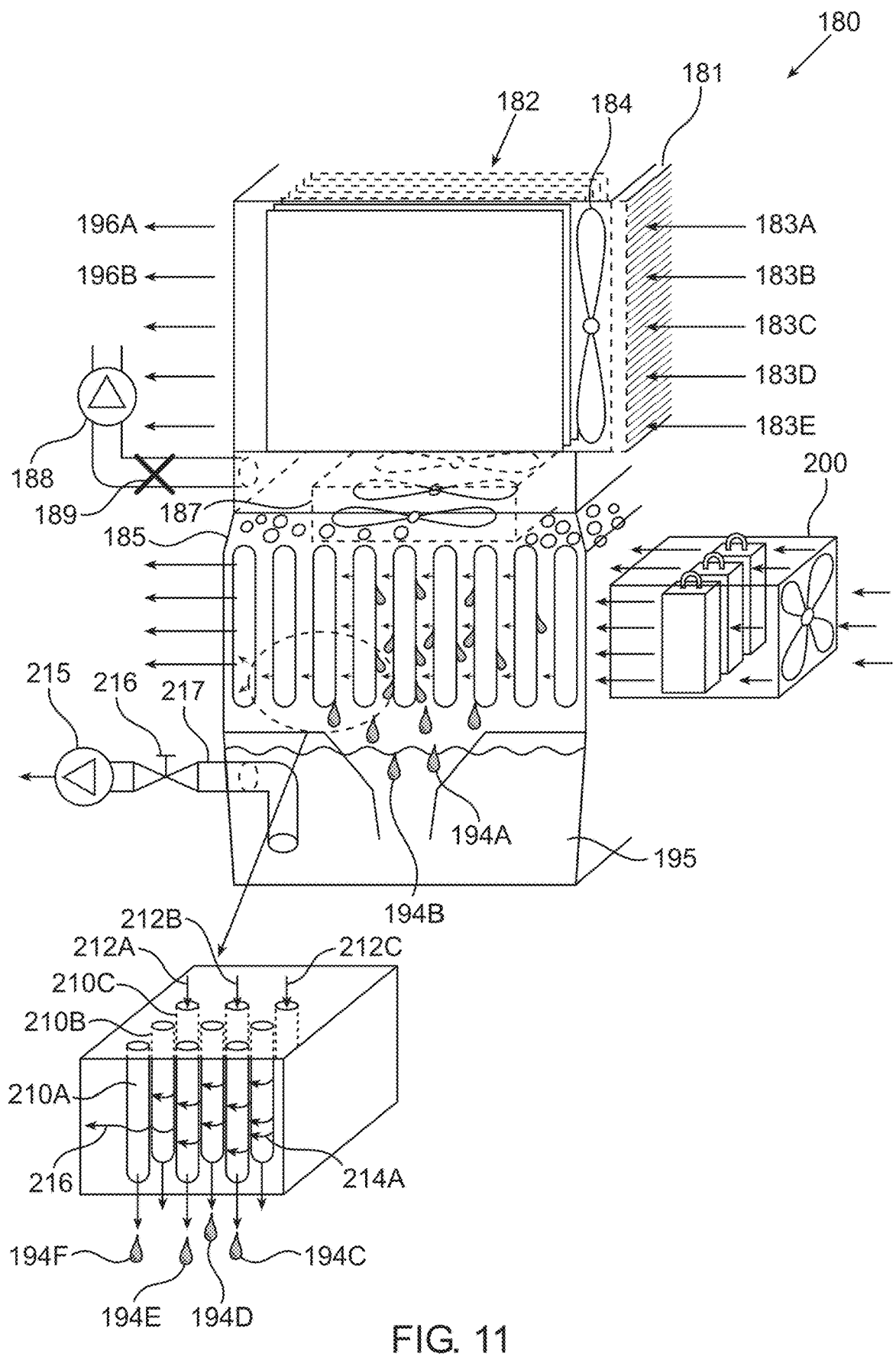
FIG. 11 A schematic illustration of an atmospheric water generator utilizing compressor and cooling system; according to some embodiments.
Figure 12:
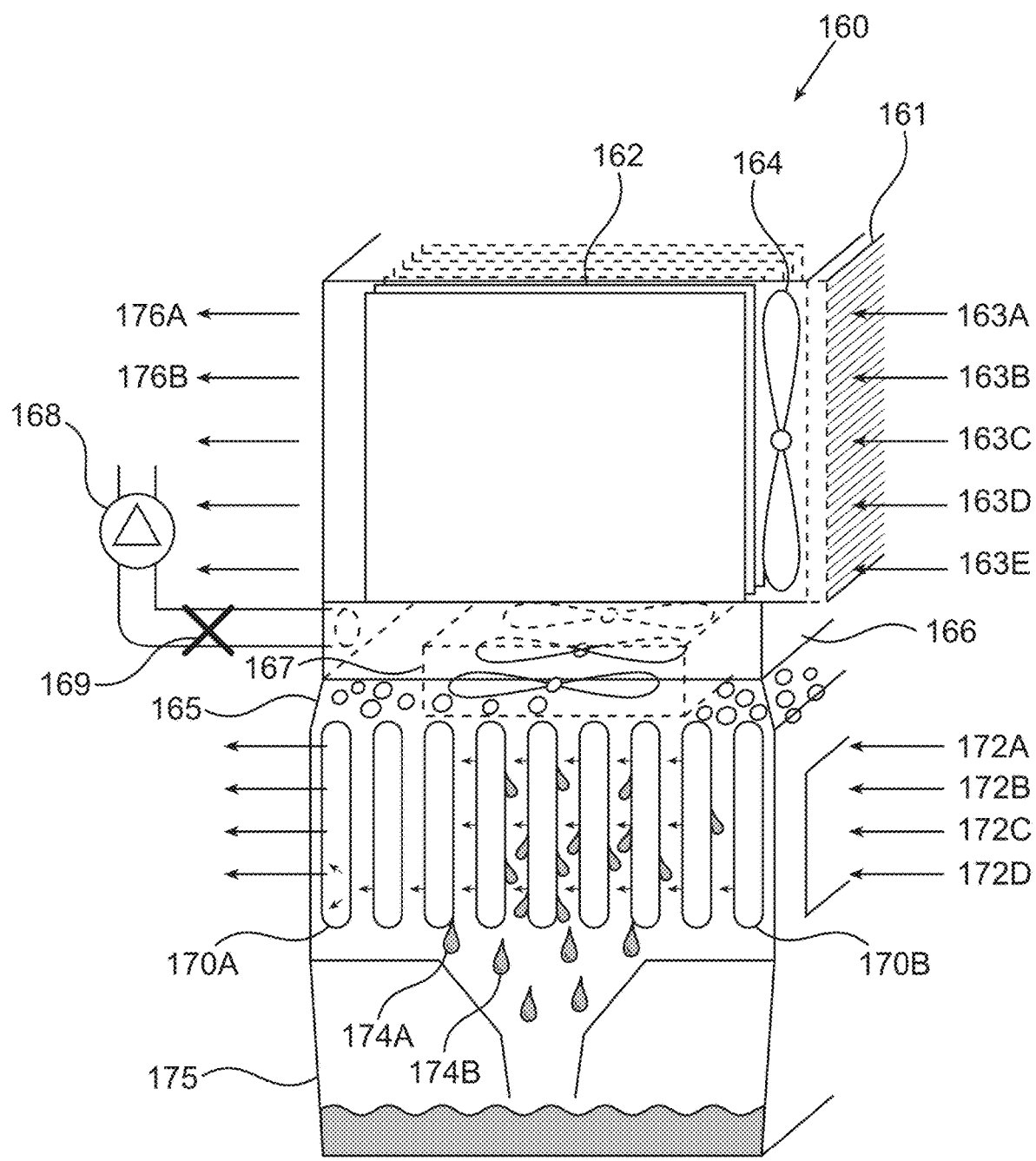
FIG. 12 A schematic illustration of an atmospheric water generator utilizing compressor and pump to reach dew point; according to some embodiments.

According to some embodiments, as further mentioned above, to condense out water vapor from an air and water vapor mixture, not only cooling to dew point can be used, but also compression of the water vapor can promote condensation. Reference is now made to FIGS. 11 and 12, which depict two structures using compression to promote atmospheric water generation at a higher temperature (closer to or even ambient) than that would be necessary if only cooling was used, while using the disclosed vapor transporting, specific membrane. In FIG. 11, compression plus cooling are used to reach the dew point, whereas in FIG. 12, the dew point is reached using compression alone. In both cases, it is preferred to first reduce the pressure measurably to 1 to 5 mmHg or even above 10*mmHg, in the case when the initial water vapor level itself is above 10*mmHg, inside the Water Generation Cavity. In some exemplary embodiments, during this stage air is preferably not flown across the vapor exchange unit.

Reference is now made to FIG. 11, which illustrates an embodiment in which the device further includes a cooling capability, when very high ambient temperatures are present, and compression alone may not be sufficient to condense out the vapor. As shown in FIG. 11, device (180) includes water vapor selectivity unit (182), which is used to separate water vapor from ambient, moist air (represented by arrows 183A-E). A coarse filter (such as filter 181) may be located externally to the water vapor selectivity unit, to prevent large debris from affecting the separation membrane of the molecular selective processing unit. The ambient air may be driven into the water vapor selectivity unit, by aid of a fan, pump, or any type of propeller (shown as fan 184). Dry air, stripped of water vapors flows away from the device (represented by arrows 196A-B). The device further includes a vapor exchange unit, which is embodies as a compressed water vapor compartment (shown as compartment 185), which is separated from the water vapor selectivity unit by compressor means. The two compartments are separated via the compressor means, so that that above the compressor the pressure is approx. 5 to 15 mbar, which is pre-condensation and in the second compartment (post compressor), the pressure is raised sufficiently so water condenses out, for example between 20 to 70 mbar, depending upon ambient temperature). The water vapor compartment includes a compressor (shown as compressor 187), which may be centrifugal, roots and screw compressors, turbomolecular or vane pump. The device further includes a vacuum pump (shown as vacuum pump 188), having a tap (tap 189) for controlling air flow to/from the device. For example, the tap may be closed after the appropriate vacuum level has been reached in both the compressed water vapor compartment and the water vapor selectivity unit. The compressed water vapor compartment further includes an active cooling unit (200), which can cool ambient to about 22° C. The water vapor compartment further includes, cooled water generation tubes (shown as exemplary tubes 210A-C, in the close up view in the lower panel of FIG. 11). Through the water generation tubes, the compressed water vapors (100% water vapors, represented by arrows 212A-C) are driven. The tubes are cooled (by flow of air, represented by exemplary arrow 214A), to result in the condensation of water and generation of water droplets (shown as water droplets 194A-F). The water droplets (shown as representative droplets 194A-B), which are consequently formed in the compressed cooled water vapor compartment are collected in water storage/collector (shown as water storage 195). To the water collector, a pipe (shown as pipe 217) may be connected and may be used to transport water from the water collector to another, remote water storage. For transferring the water to a remote storage a water pump (shown as pump 215) may be connected to the pipe and a tap ((shown as tap 216), which may be, for example, a solenoid tap may be used.

As shown in FIG. 12, device (160) includes water vapor selectivity unit (162), which is used to separate water vapor from ambient, moist air (represented by arrows 163A-E), as detailed above herein. A coarse filter (such as filter 161) may be located externally to the water vapor selectivity unit, to prevent large debris from affecting the separation membrane of the molecular selective processing unit. The ambient air may be driven into the water vapor selectivity unit, by aid of a fan, pump, or any type of propeller (shown as fan 164). Dry air, stripped of water vapors flows away from the device (represented by arrows 176A-B). The device further includes a vapor exchange unit, which includes two compartments: the first compartment side (166) which is in direct contact with the WG side of the water vapor selectivity unit; and a second compartment, which is the compressed water vapor compartment (shown as compartment 165), which includes also the surfaces for water precipitation. Both sides/compartments are separated from each other by a compressor means (167). The two compartments are separated via the compressor means, so that above the compressor (pre compressor), the pressure will generally be between about 5 to 15 mbar, which is pre-condensation, and in the second compartment (post compressor, the side in which the water precipitates), the pressure is raised sufficiently (for example between 20 to 70 mbar, depending on ambient temperature) so water condenses/precipitates out. The compressor (shown as compressor 167), may be centrifugal, roots and screw compressors, turbomolecular or vane pump. The device further includes a vacuum pump (shown as vacuum pump 168), having a tap (tap 169) for initial reduction of the pressure in the two compartments, so that after being realized and closed off, the initial pressure within the two sides of the compartment are close to vacuum conditions, and where from then on, only water vapor can enter, via the water vapor selectivity unit. As only water vapor can now enter these compartments, the water vapor pressure within will reach the vapor pressure in the ambient air. For example, the tap may be closed after the appropriate vacuum level has been reached in both the compartments on either side of the compressor which both together form the vapor exchange unit together with the W.G. side of the water vapor selectivity unit. The compressed water vapor compartment may further include a means to remove heat created e.g. latent heat as created during the precipitation generation, for example, in the form of ambient air convection alone (represented by arrows 172A-D) flowing around the closed water generation compartments (shown as exemplary tubes 170A-B, in which water vapor can condense to water droplets). The water droplets (shown as representative droplets 174A-B), which are consequently formed in the compressed cooled water vapor compartment (i.e. in the water generation tubes) can be collected in water storage/collector (shown as water storage 175).

According to some embodiments, after the appropriate vacuum level has been reached, the connection between vacuum and water generation compartment is closed off, and then, ambient air is then driven alongside the molecular selective system, and where the initial vacuum produced in the water generation section (side), provides a strong gradient to promote flow of water vapor from the ambient air, to the water generation chamber as well as dictating a mixture where the final percentage of water vapor can be close to 100%.—e.g. pure water vapor.

In some embodiments, the pressure of the water vapor in the entire vapor exchange unit will equate with that of the water vapor pressure in the ambient air. Such pressures will be usually in the range of 5 to 15 mbars depending on the ambient temperature and humidity but may be as low as 1 to 5 mbar, or higher than 15 mbar for extreme climates (such as, desert or tropical areas). After operating the compressor, the higher pressure created in the second compartment will increase until 100% relative humidity is reached for that specific ambient temperature, where any further compression will initiate precipitation in the second (lower) compartment even at the higher ambient temperatures. In some embodiments, when this occurs, the latent heat produced can be removed using a flow across the tubes or similar where precipitation is being generated. Thus, in some embodiments, the compressor creates an increase in pressure, which is enough to reach a new dew point (compressed pressure dew point, this at a temperature much higher than that would be necessary if cooling alone was used).

In some embodiments, since the compressor takes the essentially pure water vaper from the upper compartment side, and the resulting compressed air is continuously precipitated out, maintaining a constant gradient between the upper compartment and the ambient air flowing in the water vapor selectivity unit on the A.D. side, promoting a constant flow of vapor into the upper compartment, for continuous compression and consequent water precipitation.

According to some embodiments, compression of a highly concentrated water vapor gas at low pressures requires significantly less energy than when compressing a water vapor and air gas mixture at atmospheric pressure (e.g. as would be in the initial ambient condition, before the specific molecular processing/separation). Unlike with ambient air at atmospheric pressure, when the low pressure pure vapor is compressed, the compression induces the phase change and water condenses out, i.e. the desired result, with minimal waist or work against resistance.

According to some embodiments, as the process continues, the water vapor in the upper compartment side becomes more and more concentrated in water vapor, this since only water vapor can pass through the molecular selective processing unit, while simultaneously, water is being continuously removed, with the vapor gradient optimized between the A.D. and W.G. side. The compression pressure required to reach dew point then adjusts until steady state dew point is reached, depending on the temperature in the specific compartment.

According to some embodiments, in parallel, during the compression of the water vapor, together with the condensation and water generation, where latent heat is naturally released, which consequently increases the temperature of the cavity (compartment) until steady state is reached, the extra heat is naturally removed via the heat exchange with ambient air. This steady state may be improved by the continuous removal of the heat created from the latent heat of condensation, by the air flowing in the air delivery cavity, which may be flown across heat conducting fins or other appropriate heat exchanging structure, consequently cooling them, when connected to the internal fins inside the water generation side. Thus, in embodiments in which compression alone is used in the water generation step, and the compression pressure is increased sufficiently so that dew point temperature is just slightly more than ambient temperature, the latent heat may removed naturally via conduction and convention.

In such embodiments, depicted in FIGS. 11 and 12, both the compression and/or cooling work/act together to enhance and produce dew point conditions for promoting condensation. As a result of the use of compression and cooling, the temperature of dew point is increased and where together with other parameters that can promote water generation, a dew point temperature can be accomplished using the compression alone, where it is even higher than the ambient temperature. When this occurs, the latent heat which is released, may be removed to the ambient in a natural flow of energy from a hotter region to a cooler region. When this condition is realized, there is no need to add further energy from an external power source to remove the latent heat, to result in advantageously substantially increasing the efficiency of the system.

In some embodiments, as depicted in FIGS. 11 and 12, the water generation of the compressed, super concentrated water vapor is achieved in conducting tubes or similar structure, where the incoming air flows around them and consequently removing heat from the enclosed water vapor, and also removing the latent heat produced in the process. This or any efficient heat exchanging unit could be used for maximum and optimum thermodynamic interaction is made. The tubes or cavities may be directed downwards in order to optimize the generated water collection. In some embodiments, the tubes or cavities are optimized for maximal surface area and heat transfer.

According to some embodiments, active cooling may only be necessary, when the ambient temperature is higher than the dew point compression temperature chosen. Even when the ambient temperature is too high to rely only upon compression, the level of cooling is only equal to that difference (delta) in temperature necessary, and not down to the temperature of natural dew point as required with other systems. Furthermore, as detailed above, the mass of air necessary to cool the system to only the delta temperature, is normally of less mass than that used in the other systems. According to some embodiments, not only will there be far less energy used to remove the sensible heat, but also, there will be no need to spend further energy to remove a large quantity of latent heat energy, if the compression is sufficient as to promote a dew point temperature higher than the ambient air.

According to some embodiments, in order to maximize efficiency, one or more of the various parameters, including, initial vacuum, compression rate and level, cooling temperature, air cooling flow rate, and the like, can be regulated or changed, as a function of measured internal and the ambient humidity, pressures and/or temperatures. According to some embodiments, by maximizing efficiency, the disclosed devices and systems can efficiently operate under extreme atmospheric conditions, such as, extreme dry or temperature conditions, whereas, currently used methods and systems are not suitable and unable to condense out water.

According to some embodiments, with reference to FIGS. 11-12, and to examples 1-2 below, the stages of efficiently condensing water from the separated-out water vapor can include the steps of: The vacuum pump can be used to reduce the WG pressure (for example, to about 1 to 5 mmHg, and in cases of initial high humidity to even 10 mmHg. In such a case, this stage may be performed at least twice—first reduce to 5 to 10 mmHg, wait till equilibrium occurs with water vapor equalizing between A.D. and W.G. sides of the molecular selective processing unit, and then once more to reduce vacuum to minimum. This way, each new vacuum run increases the water vapor concentration in the W.G.). This step is utilized in order to provide optimal gradient of water vapor, with the even low ambient water vapor pressure. The vacuum pump is then turned off, and the compression stage may be initiated, by activating a suitable compressor. It is to note that the ambient air is flown across the membrane surface (of the molecular selective processing unit) continuously during the compression stage and process, in order to maintain the water vapor gradient. The compressor increases the pressure of the substantially pure water vapor in the WG cavity (in the "closed compression cavity" or "CC"). Depending on the internal temperature of the CC, there is a compressed critical pressure for which the water vapor can start to condense out. In some embodiments, a centrifugal type compressor is appropriate and efficient for such a process.

In some exemplary embodiments, where the internal CC temperature is equal to the ambient temperature, then there will be an equivalent critical pressure for which the water starts to condense out. When reaching this compressed pressure, and water condenses out and latent heat is released. Since the CC temperature on initiation was equal to ambient, the latent heat will increase the eternal temperature to be higher than the ambient, and heat can flow naturally from inside to outside, depending on the rate of water generation and heat transfer. A delta temperature, and hence consequent compressed pressure may be chosen to stabilize the process, advantageously at no further expense of energy.

According to some embodiments, active cooling may also used (as shown in FIG. 11). Such cooling is only necessary for cooling down the ambient air to temperatures, such as in the range of 15 to 25 degrees C., and this only necessary if the ambient temperature is higher than these temperatures. Consequently, the level also of compression necessary is reduced substantially. According to some embodiments, the levels of cooling, compression and/or initial vacuum level may be chosen and adjusted to provide optimal efficiency for the given ambient condition at that time, providing a far greater flexibility to increase efficiency of the system to result in a substantial increase in efficiency particularly when the ambient temperature is close to or even less than the critical temperature chosen for a given compression level.

According to yet further exemplary embodiments, the systems, devices and methods are measurably more efficient: Removal of latent heat using natural means based on Thermodynamics can reduce power needs by at least 0.6 kW*H/L for all climates: Cooling requirements down to only 15 to 25° C. of only the selected water vapor, enabling the use of lower compression levels and consequently lower demands on compressor performance level. And as opposed to cooling the entire mass of air as in the prior art, to 2 to 4 degrees C. (as in other devices), this will also reduce the sensible heat and enthalpy per Liter water produced to at least 50% and probably to approximately 10 to 25% on average. The power requirements for the extra compression stage is not significant, since as explained, substantially pure water vapor is compressed: Hence the proposed device and method is expected to provide power needs of 0.2 to 0.5 kW*H/Liter for the equivalent climates measured by Farshid et. al., 2018. This when only the compressor is necessary to generate the precipitation (e.g. natural removal of latent heat).

According to some further embodiments, night periods where the ambient temperature are naturally lower and humidity generally higher, could be used as the main period for water generation, while during the day, solar energy may be stored.

According to some embodiments, to aid and enhance the removal and collection of water, the cooling fins of the cooling means may be coated with a super hydrophobic coating (for example using sprays). In further embodiments, the cooling means have a large surface area, since water condensation and its precipitation is improved when there are surfaces to form upon.

According to some embodiments, within the cooling section of the Water Generation cavity, it is possible to include surface areas where their structure, physical properties and/or chemical properties can naturally enhance and promote the condensation and precipitation of water.

In some embodiments, the water generating regions (for example, in the form of columns/tubes) can be positioned upwards with water vapor flow downwards, so that any precipitated-out water droplets can fall towards the water collection region, by the force of gravity.

In some embodiments, where the enriched vapor air mixture is stirred within the water generation cavity, the stirring structure may be designed in the form of a fog net, to further enhance the precipitation of the water droplets, where the stirring further enhances the water vapor movement through the fog net structure.

In some embodiments, the structure and texture of the Darkling Beetle may be used as the surface of the region which upon the precipitation occurs, e.g. fins with using cooling means and the tubes with the compressor structure. This to further enhance the water generation.

In some embodiments, hydrophobic copper nanowires of 2D and 3D structures may be used to enhance precipitation and heat removal during water generation in the water generating side.

According to some embodiments, this devices and systems do not allow the condensed-out water to reevaporate again. To this aim, in some embodiments, an added suction means may be incorporated to help remove the liquids for collection into an appropriate container, continuously or intermittently.

According to some embodiments, it is an advantage to maintain the vacuum level lower than the vapor pressure of the vapor in the ambient humidity being stripped and redirected for condensation. Since this inherently will promote and naturally maintain the gradient between the two chambers/regions (AD and WG). Though, still, even if this vacuum level is not reached, the water removal rate will also help to maintain this gradient, or further, by using a stronger throughput rate of the vacuum pump.

According to some embodiments, the cooling methods and means may include, for example, but not limited to: refrigerant and compressor, heat exchanger, Peltier, and the like, or any combination thereof. Each possibility is a separate embodiment. In some embodiments, each of these means may be further enhanced with respect to efficiency, by utilizing the high ambient air flow by removing heat from such positions, as heat sinks, where efficient heat removal can improve power efficiency.

According to some embodiments, since the separating media between the WG and AD side is a selective membrane, where no air or its contents can be transported (other than cations like water vapor), it is further totally impermeable to airborne contaminations, such as, viruses, bacteria or other particles, to and consequently permit the generation of clean pure water. This obviates the use of further filtration means and/or other disinfectant means, such as, for example, Chlorine, ozone treatment, UV treatment, and the like. Likewise, dust, sand particles, and the like, do not reach the water generation region, hence eliminating the need for strong filtration and or electrostatic filter structures at the entrance of the input air, which promote a load to the power needs for pushing air through the system. Likewise, no further small particle filtration is needed after the water is collected.

According to some embodiments, the water generating device and system may be controlled and regulated for optimum power consumption. In some embodiments, the control is performed externally, by utilizing a control unit, capable of controlling the activity or function of one or more of the components and/or operating parameters of the systems and devices, such as, for example, temperature, pressure, vacuum, amount of incoming air, rate of air flow, rate of water production, amount of water vapors, air flow speed, pump(s) level and throughput, pressure gradient, cooling and/or compression level and power, water removal speed, and the like, or any combination thereof. In some embodiments, the control unit can automatically and/or manually control and regulate the operation of the devices and systems disclosed herein. In some embodiments, the control unit can communicate with one or more sensors of the devices and systems. In some embodiments, the connection and/or communication between the control unit and the devices and systems may be wired or wireless. In some embodiments, the control unit can be used to activate such operating parameters so as to produce the water in the most efficient manner possible and appropriate for the ambient temperature and relative humidity. In some embodiments, the control unit may include one or more processors.

In some embodiments, the control unit is a sensing and monitoring program system, to optimize power efficiency by optimally regulating the different parameters (such as, air flow speed, pump level and throughput, pressure gradient, water activity, cooling and/or compression level and power, and water removal speed), based upon measuring and monitoring of temperatures (ambient and internal (such as in the cavities/spaces), relative humidity (ambient and after drying of the air), air drying efficiency, water generation efficiency, and the like, or any combination thereof.

In some embodiments, the control unit can include or execute various algorithms, including self learning algorithms, to determine the best efficient means for generating water for any given ambient condition and environment. In some embodiments, the control unit may utilize a clock for regulation of parameters as function of time. In some embodiments, the control unit may utilize received weather forecasts for adjusting operating parameters, while taking into account the weather forecast.

In some embodiments, the control unit can use time-based programs to improve efficiency, for example, when the devices and systems are operable mainly on solar power source, whereby energy for operation is collected during light hours (day time). This may be accomplished by basing programing the system for optimal daily power to water efficiency operation. When the anticipated temperature cycles or forecast is known for the following night, then the operation may be optimized during the day, when solar power is abundant, so that during the night, when the relative humidity (R.H.) is generally higher than the day, there will be enough stored power to operate efficiently also during the night (dark hours).

According to some embodiments, there is provided a system for precipitating water from atmospheric air, the system comprising one or more devices for precipitating water from atmospheric air; and a control unit configured to control and regulate operation of the one or more devices, wherein each of the devices includes at least: a) a water vapor selectivity unit comprising: i) a first side being the air delivery side; and ii) a second side, being the water generation side; and a molecular selective processing unit, said molecular selective processing unit comprises a selective membrane having a thickness of less than about 200 micron, and one or more support means on a first face of the membrane and/or on a second face of the membrane; wherein said molecular selective processing unit is placed between said first side and second side to separate said first and second sides; and b) a vapor exchange unit located in the water generation side, said vapor exchange unit is configured to precipitate (generate) water from water vapors selectively entering the water generation side from the air delivery side through the molecular selective processing unit.

According to some embodiments, the control unit of the system is configured to control one or more operating parameters, said parameters are selected from: internal temperature in various compartments of the device, air flow speed to and/or within the device, pump level, pump throughput, pressure gradient, cooling level, compression level, compression power, vacuum levels, water removal rate, or any combination thereof. In some embodiments, the control unit may be configured to control various operation parameters of the device, based on environmental parameters, the environmental parameter may be selected from, but not limited to: ambient temperature, relative humidity, barometric pressure, day light time, or any combination thereof. Each possibility is a separate embodiment.

According to some embodiments, the control unit may be manually operated.

According to some embodiments, the control unit may be automatically operated, based on the environmental parameters, to allow the efficient generation of water from the atmospheric air.

According to some embodiments, there is provided a device for precipitating water from atmospheric air, the device comprising:
  a) a water vapor selectivity unit comprising:
    i) a first side being the air delivery side; and
    ii) a second side, being the water generation side; and
  a molecular selective processing unit, said molecular selective processing unit comprises a selective membrane having a thickness of less than about 200 micron, and one or more support means on a first face of the membrane and/or on a second face of the membrane; wherein said molecular selective processing unit is placed between said first side and second side to separate said first and second sides; b) a vapor exchange unit located in the water generation side, said vapor exchange unit is configured to precipitate water from water vapors selectively entering the water generation side from the air delivery side through the molecular selective processing unit; wherein said vapor exchange unit has an upper compartment and a lower compartment;
  c) a vacuum pump configured to create vacuum (at least essentially create vacuum) in the vapor exchange unit; and
  d) a compressor, physically separating between the upper compartment of the vapor exchange unit and the lower compartment of the water vapor exchange unit, said compressor is configured to increase the water vapor pressure in the lower compartment of the water vapor exchange unit, to thereby allow water precipitation in the lower compartment of the vapor exchange unit, wherein said water precipitation is achieved at room temperature.

According to some embodiments the device further include e) a tap, configured to be closed after the essential vacuum is achieved in the vapor exchange unit, to thereby maintain the vacuum in the vapor exchange unit, to allow the entrance of essentially pure water vapor, through the molecular selective processing unit, such that the water vapor pressure within the vapor exchange unit is equal to the water vapor pressure in the ambient air.

According to some embodiments, the device may further include f) means to remove latent heat created in the vapor exchange unit, during the precipitation of water.

According to some embodiments, the compressor may compress the water vapors after the vacuum is created in the vapor exchange unit by the vacuum pump.

According to some embodiments, there is provided a method for precipitating water from atmospheric air, the method comprising one or more of the steps of:

providing a flow of air to first side of a molecular selective processing unit, said molecular selective processing unit includes a water vapor selective membrane, having a thickness of less than about 200 micron, and one or more support means on a first face of the membrane and/or on a second face of the membrane; wherein the molecular selective processing unit is placed between the first side, being the air delivery side and a second side, being a water generation side; and precipitating (generating) water in the water generation side, wherein the water is precipitated (generated) from water vapors that have selectively entered the water generation side from the air delivery side only through the molecular selective processing unit.

According to some embodiments, the step of precipitating the water is performed by one or more of the steps of: cooling of selective water vapor to reach a dew point and consequent precipitation of water from the water vapors; compression of selective water vapor to reach dew point and consequent precipitation of water from the water vapor; cooling and compression of selective water vapor to reach dew point and consequent precipitation of water from the water vapor. Each possibility is a separate embodiment.

According to some embodiments, precipitating the water in the water generation side is performed on a precipitating surface area, said surface area is at least partially made of or coated with a hydrophobic material, to facilitate the precipitation. In some embodiments, the precipitating surface area is a cooled surface area.

According to some embodiments the method may further include a step of maintaining a continuous water vapor gradient across the selective membrane.

In some embodiments, the continuous water vapor gradient may be maintained by the continuous precipitation of water from the selective water vapor in the water generation side. In some embodiments, the continuous precipitation of water may be performed by one or more of the steps of: diffusing or transporting the water vapors to the cooling element and/or compression unit; moving the water vapor in a closed circulation loop, via the cooling element, to return as dry and cold air to the separation membrane.

In some embodiments, the continuous water vapor gradient may be maintained by a step of creating a pressure drop across the selective membrane and continuously precipitating water from the water vapor to remove the generated water.

According to some embodiments, the step of creation of a continuous water vapor pressure gradient may be performed by: reducing the pressure in the water generation side and/or by increasing the pressure in the air delivery side. Each possibility is a separate embodiment.

According to some embodiments, the method may include one or more of the steps of: compressing, cooling and/or creating vacuum in the water generation side. Each possibility is a separate embodiment.

In some embodiments, the method includes compressing the pressure in the vapor to allow precipitation of water at room temperature.

According to some embodiments, when using compression it may be performed together with vacuum creation, to first promote high concentration water vapor at 1 to 35 mbar (at extreme ambient conditions) or at 5 to 15 mbar (at normal ambient conditions), and continuously maintain such pressures to form the continuous selective input of vapor from ambient air stream via the molecular selective processing unit.

According to some embodiments, the method may further include a step of collecting the pure water generated from the atmospheric air, for example, in the dedicated region/container in the device.

According to some embodiments, the method may further include sensing or measuring one or more environmental parameters, including such parameters as, but not limited to: ambient temperature, relative humidity and/or barometric pressure.

According to some embodiments, when practiced on the device for precipitating water from atmospheric air, the method may further include sensing or measuring operating parameters of the device, the parameters include such parameters as, but not limited to: internal temperature in various compartments of the device, air flow speed to and/or within the device, pump level, pump throughput, pressure gradient, cooling level, compression level, compression power, vacuum levels, water removal rate, amount of generated water, or any combination thereof. Each possibility is a separate embodiment.

According to some embodiments, there is provided a method for precipitating water from atmospheric air, the method comprising one or more of the steps of:

providing a flow of air to first side of a molecular selective processing unit, said molecular selective processing unit includes a water vapor selective membrane, having a thickness of less than about 200 micron, and one or more support means on a first face of the membrane and/or on a second face of the membrane; wherein the molecular selective processing unit is placed between the first side, being the air delivery side and a second side, being a water generation side;

precipitating (generating) water in the water generation side, wherein the water is precipitated (generated) from water vapors that have selectively entered the water generation side from the air delivery side only through the molecular selective processing unit.

According to some embodiments, there is provided a method for precipitating water from atmospheric air, the method comprising one or more of the steps of:

providing a flow of air to first side of a v, said molecular selective processing unit comprises a water vapor selective membrane, having a thickness of less than about 200 micron, and one or more support means on a first face of the membrane and/or on a second face of the membrane; wherein said molecular selective processing unit is placed between the first side, being the air delivery side and a second side, being a water generation side; and creating and maintaining a vacuum in a water vapor exchange unit located in the water generation side;

compressing the water vapors in a lower compartment of the water vapor exchange unit to increase the water vapor pressure is said lower compartment, to thereby allow water precipitation in the lower compartment, wherein said water precipitation is achieved at room temperature; and precipitating water in the water generation side, wherein the water is precipitated from water vapors selectively entering the water generation side from the air delivery side only through the molecular selective processing unit.

According to some embodiments, the method may further include the steps of:

physically separating between the lower compartment of the water vapor exchange unit and an upper compartment of the water vapor exchange unit, by the compression means (compressor); and removing latent heat created in the vapor exchange unit, during the precipitation of water.

Each possibility is a separate embodiment.

In some embodiments, the pure water generated by the devices and systems may be stored in the device itself and/or may be delivered to a separate storage unit. In instances where the water are delivered to a separate storage unit, it can allow, for example, the placement of the water generation device in a less accessible position (for example, roof or closed off region), where the location of the water storage and dispensing unit is an accessible position.

In some embodiments, the collected water can be bottled or stored in suitable containers.

According to some embodiments, the units of the device and systems, may further be used for applications where drying a gas mixture is necessary, by, for example, replacing the standard desiccant method, and where the separated out pure water for human, industrial or agricultural needs. According to some embodiments, the methods disclosed herein can be used not only to generate water at high efficiencies in any ambient condition, but also to totally dehydrate moist atmospheres or gas mixtures, where even the extracted water can be used as a byproduct.

In the description and claims of the application, each of the words "comprise" "include" and "have", and forms thereof, are not necessarily limited to members in a list with which the words may be associated.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

EXAMPLES

Example 1: Ambient Temperatures ~35 Deg. C., with R.H. As Low as 20% (i.e. Desert Conditions At ambient 35 deg. C., and an internal CC temperature of even 45 deg. C. i.e. delta temperature of 10 deg. C. The compressed critical pressure necessary to initiate condensation, will be some 72 mmHg.

Example 2: Ambient Temperatures ~15 Deg. C. (for Example Night Time), but Still with R.H. As Low as 20% (i.e. Desert Conditions)

At ambient 15 deg. C., and an internal CC temperature of 25 deg. C. i.e. delta temperature of even 10 deg. C. (though probably far less will be necessary). The compressed critical pressure necessary to initiate condensation, will be only some 24 mmHg.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

What we claim is:

1. A device for continuously precipitating water from atmospheric air, the device comprising:

a) a plurality of a water vapor selectivity units, each unit comprising: a first side being the air delivery side and ii) a second side, being the water generation side; and a molecular selective processing unit, said molecular selective processing unit comprises a selective membrane having a thickness in the range of about 10-150 micron, said membrane is a Nafion membrane, or a non-porous membrane impregnated with Nafion solution; and one or more support means on a first face of the membrane and on a second face of the membrane, the support means is configured to increase the thermal isolation from either side of the membrane, said support on the second face of the membrane comprises a hydrophobic porous membrane; wherein said molecular selective processing unit is placed between said first side and second side to separate said first and second sides; and b) a vapor exchange unit located in the water generation side, said vapor exchange unit is configured to precipitate water from water vapors selectively entering the water generation side from the air delivery side through the molecular selective processing unit;

wherein a continuous water vapor gradient across the selective membrane is maintained by condensation to water droplets; thereby facilitating continuous water precipitation from atmospheric air.

2. The device according to claim 1, wherein the support on the first side of the membrane comprises a non-porous or semi-porous grid structure.

3. The device according to claim 1, wherein the water generation side is in a form of a closed cavity and/or wherein the water generation side is essentially insulated.

4. The device according to claim 1, wherein condensation and pure water precipitation in the vapor exchange unit is achieved by one or more of: selective water vapor cooling to reach a dew point and consequent condensation of water from the water vapors; selective water vapor compression to reach dew point and consequent condensation; selective water vapor cooling and compression to reach dew point and consequent condensation.

5. The device according to claim 1, wherein the water is precipitated on a precipitating surface area in the vapor exchange unit, said precipitating surface area is at least partially made of or coated with hydrophobic material.

6. The device according to claim 1, wherein the continuous water vapor gradient is maintained by the continuous condensing of water from the selective water vapor in the water generation side, wherein continuous condensing of water is achieved by one or more of: diffusion or transport of the water vapors to the cooling element and/or a compression unit; and/or movement of the water vapor in a closed circulation loop, via the cooling element, to be returned as dry and cold air to the separation membrane, or wherein the continuous water vapor gradient is maintained by creation of pressure drop across the selective membrane and continuous condensation of water from the water vapor and the consequent removal of the generated water, or wherein the continuous water vapor pressure gradient is created using a vacuum pump configured to reduce the pressure in the water generation side and/or a compressor to increase the pressure in the air delivery side.

7. The device according to claim 1, further comprising a vacuum pump configured to essentially create vacuum in the vapor exchange unit; and a compressor physically separating between an upper compartment of the vapor exchange unit and a lower compartment of the water vapor exchange unit, said compressor is configured to increase the water vapor pressure in the lower compartment of the water vapor exchange unit, to thereby allow water precipitation in the lower compartment of the vapor exchange unit, wherein said water precipitation is achieved at room temperature.

8. The device according to claim 7, further comprising a tap, configured to be closed after the essential vacuum is achieved in the vapor exchange unit, to thereby maintain the vacuum in the vapor exchange unit, to allow the entrance of essentially pure water vapor, through the molecular selective processing unit, such that the water vapor pressure within the vapor exchange unit is equal to the water vapor pressure in the ambient air, and/or
wherein the compressor compresses the water vapors after the vacuum is created in the vapor exchange unit by the vacuum pump.

9. The device according to claim 7, further comprising means to remove latent heat created in the vapor exchange unit, during the precipitation of water.

10. The device according to claim 1, further comprising one or more sensors, configured to sense or measure environmental or operating parameters of the device, wherein the parameters are selected from: ambient temperature, relative humidity, barometric pressure, internal temperature in various compartments of the device, air flow speed to and/or within the device, pump level, pump throughput, pressure gradient, cooling level, compression level, compression power, vacuum levels, water removal rate, amount of generated water, or any combination thereof.

11. A system for precipitating water from atmospheric air, the system comprising one or more devices for precipitating water from atmospheric air according to claim 1; and a control unit configured to control and regulate operation of the one or more devices.

12. The system of claim 11, wherein the control unit is configured to control one or more operating parameters, said parameters are selected from: internal temperature in various compartments of the device, air flow speed to and/or within the device, pump level, pump throughput, pressure gradient, cooling level, compression level, compression power, vacuum levels, water removal rate, or any combination thereof, wherein the control unit is configured to control operating of the device, based on environmental parameters selected from: ambient temperature, relative humidity, barometric pressure and/or day light time.

13. A method for precipitating water from atmospheric air, the method comprising:
providing a flow of air to first side of a molecular selective processing unit, said molecular selective processing unit comprises a water vapor selective membrane, having a thickness in the range of about 10-150 micron, said membrane is membrane is a Nafion membrane, or a non-porous membrane impregnated with Nafion solution, and one or more support means on a first face of the membrane and/or on a second face of the membrane, said support on the second face of the membrane comprises a hydrophobic porous membrane; wherein said molecular selective processing unit is placed between the first side, being the air delivery side and a second side, being a water generation side; and
precipitating water in the water generation side, wherein the water is precipitated from water vapors selectively entering the water generation side from the air delivery side only through the molecular selective processing unit.

14. The method according to claim 13, wherein the support on the first side of the membrane comprises a non-porous or semi-porous grid structure, or wherein the non- or semi-porous grid structure is configured to improve the diffusion and contact of water vapor molecules with the face of the membrane.

15. The method according to claim 13, wherein precipitating the water is performed by one or more of the steps of: cooling of selective water vapor to reach a dew point and consequent condensation of water from the water vapors; compression of selective water vapor to reach dew point and consequent condensation of water from the water vapor; cooling and compression of selective water vapor to reach dew point and consequent condensation of water from the water vapor and/or wherein precipitating the water in the water generation side is performed on a precipitating surface area, said surface area is at least partially made of or coated with hydrophobic material.

16. The method according to claim 14, further comprising maintaining a continuous water vapor gradient across the selective membrane, wherein the continuous water vapor gradient is maintained by the continuous precipitation of water from the selective water vapor in the water generation side, or
wherein the continuous precipitation of water is performed by one or more of the steps of: diffusing or transporting the water vapors to the cooling element and/or to a compression unit; moving the water vapor in a closed circulation loop, via the cooling element, to return as dry and cold air to the separation membrane and/or
wherein the continuous water vapor gradient is maintained by a step of creating a pressure drop across the selective membrane and continuously condensing water from the water vapor to remove the generated water; and/or
wherein the creation of a continuous water vapor pressure gradient is performed by a step of reducing the pressure in the water generation side and/or by increasing the pressure in the air delivery side.

17. The method according to claim 14, further comprising:
creating and maintaining a vacuum in a water vapor exchange unit; and
compressing the water vapors in a lower compartment of the water vapor exchange unit to increase the water vapor pressure is said lower compartment, to thereby allow water precipitation in the lower compartment, wherein said water precipitation is achieved at room temperature, and/or
wherein the method further comprises physically separating between the lower compartment of the water vapor exchange unit and an upper compartment of the water vapor exchange unit, by a compression means and/or wherein the method further comprises a step of removing latent heat created in the vapor exchange unit, during the precipitation of water.

* * * * *